United States Patent [19]

Anastas et al.

[11] 4,379,326

[45] * Apr. 5, 1983

[54] MODULAR SYSTEM CONTROLLER FOR A TRANSITION MACHINE

[75] Inventors: Mark S. Anastas, Auburn; Russell F. Vaughan, Enumclaw, both of Wash.

[73] Assignee: The Boeing Company, Seattle, Wash.

[ * ] Notice: The portion of the term of this patent subsequent to Mar. 9, 1999, has been disclaimed.

[21] Appl. No.: 128,878

[22] Filed: Mar. 10, 1980

[51] Int. Cl.³ .................. G06F 15/16; G06F 9/06; G06F 9/46

[52] U.S. Cl. .................. 364/200

[58] Field of Search .......... 364/200 MS File

[56] References Cited

U.S. PATENT DOCUMENTS

| | | | |
|---|---|---|---|
| Re. 26,171 | 3/1967 | Falkoff | 364/200 |
| 3,343,135 | 9/1967 | Freiman | 364/200 |
| 3,480,914 | 11/1969 | Schlaeppi | 364/200 |
| 3,496,551 | 2/1970 | Driscoll | 364/200 |
| 3,560,934 | 2/1971 | Ernst | 364/200 |
| 3,593,300 | 7/1971 | Driscoll | 364/200 |
| 3,643,227 | 2/1972 | Smith | 364/200 |
| 3,648,252 | 3/1972 | Thron | 364/200 |
| 3,648,253 | 3/1972 | Mullery | 364/200 |
| 4,189,771 | 2/1980 | Roever | 364/200 |

OTHER PUBLICATIONS

"Multiprocessing Scheduler", Chroust, *IBM Technical Disclosure Bulletin*, vol. 15, No. 5, Oct. 1972, pp. 1643-1644.

"Parallel Program Schemata and Maximal Parallelism I: Fundamental Results", Keller, *Journal of ACM*, vol. 20, No. 3, Jul. 1973, pp. 514-537.

"Parallel Program Schemata and Maximal Parallelism II: Construction of Closures", Keller, *Journal of ACM*, vol. 20, No. 4, Oct. 1973, pp. 696-710.

"A Fundamental Theorem of Asynchronous Parallel Computation", Keller, (T. Y. Feng Ed.), Springer-Verlag, Berlin, 1975.

"Formal Verification of Parallel Programs", Keller, *Communications of ACM*, vol. 19, No. 7, Jul. 1976, pp. 371-384.

*Primary Examiner*—James D. Thomas
*Assistant Examiner*—J. Beran
*Attorney, Agent, or Firm*—Schwartz, Jeffery, Schwaab, Mack, Blumenthal & Koch

[57] ABSTRACT

A modular system controller for a transition machine enables expansion of throughput in multiprocessing operations. The modular system controller may be embodied utilizing separate identical system controllers for computing disjoint computational problems or may utilize a plurality of identical subcomponents of the system controller for enabling a vertical or horizontal expansion of data constructs utilized in the transition machine.

47 Claims, 27 Drawing Figures

LEGEND:
  $S_j$ IS THE STATUS OF THE $j$th DATA CONDITION.
  $R_{ij}$ INDICATES THE RELEVANCE OF DATA CONDITION $j$ TO ACTIVATING PROCEDURE $i$
  $E_i$ IS THE ELIGIBILITY STATUS OF THE $i$th PROCEDURE BASED ON THE STATUS OF EACH DATA CONDITION RELEVANT TO ACTIVATING PROCEDURE $i$.

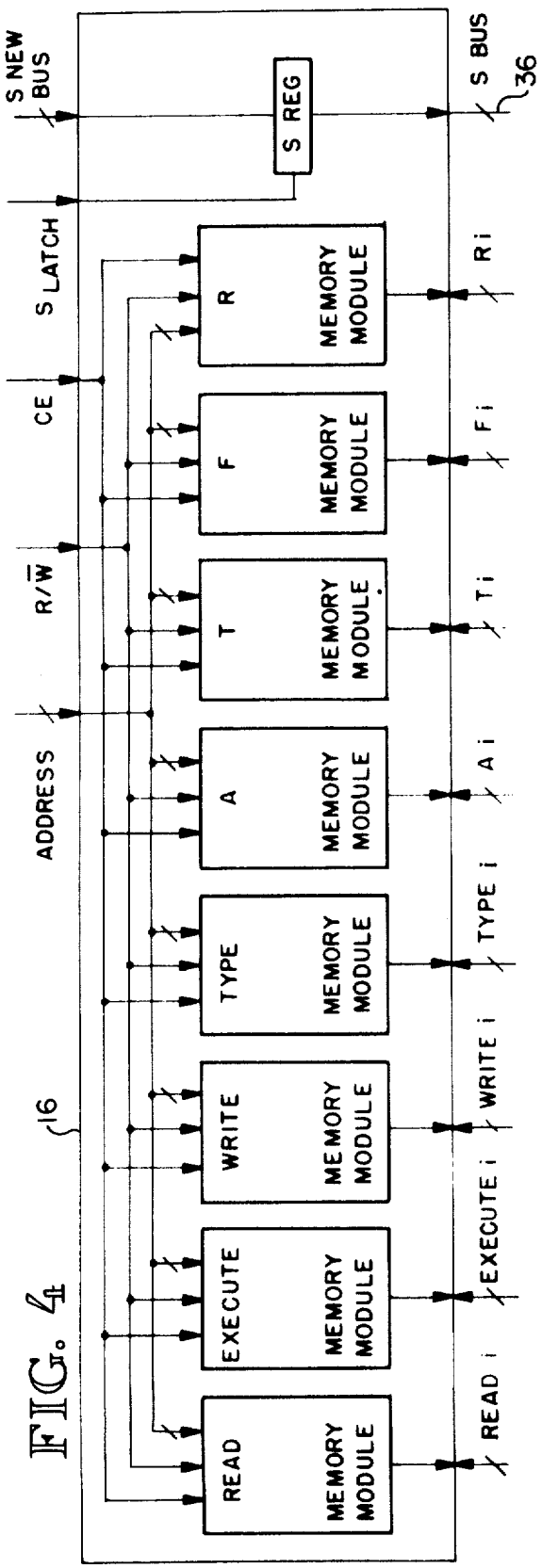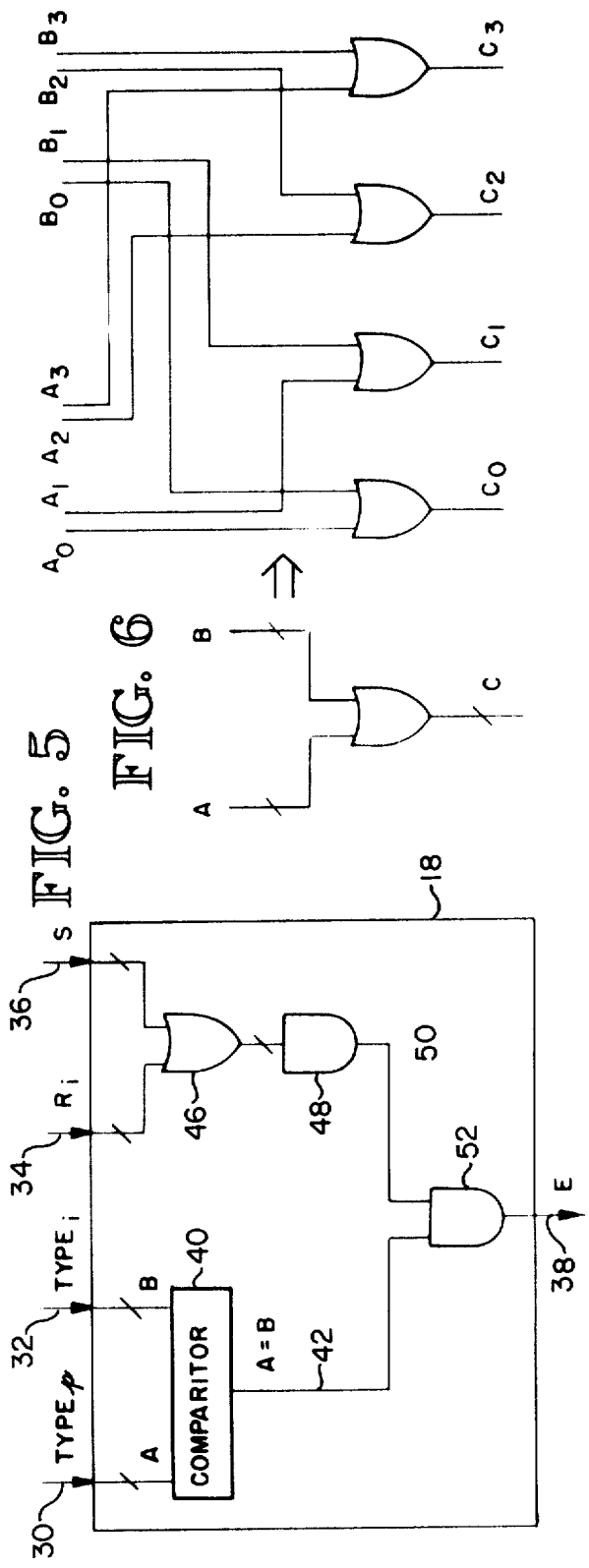

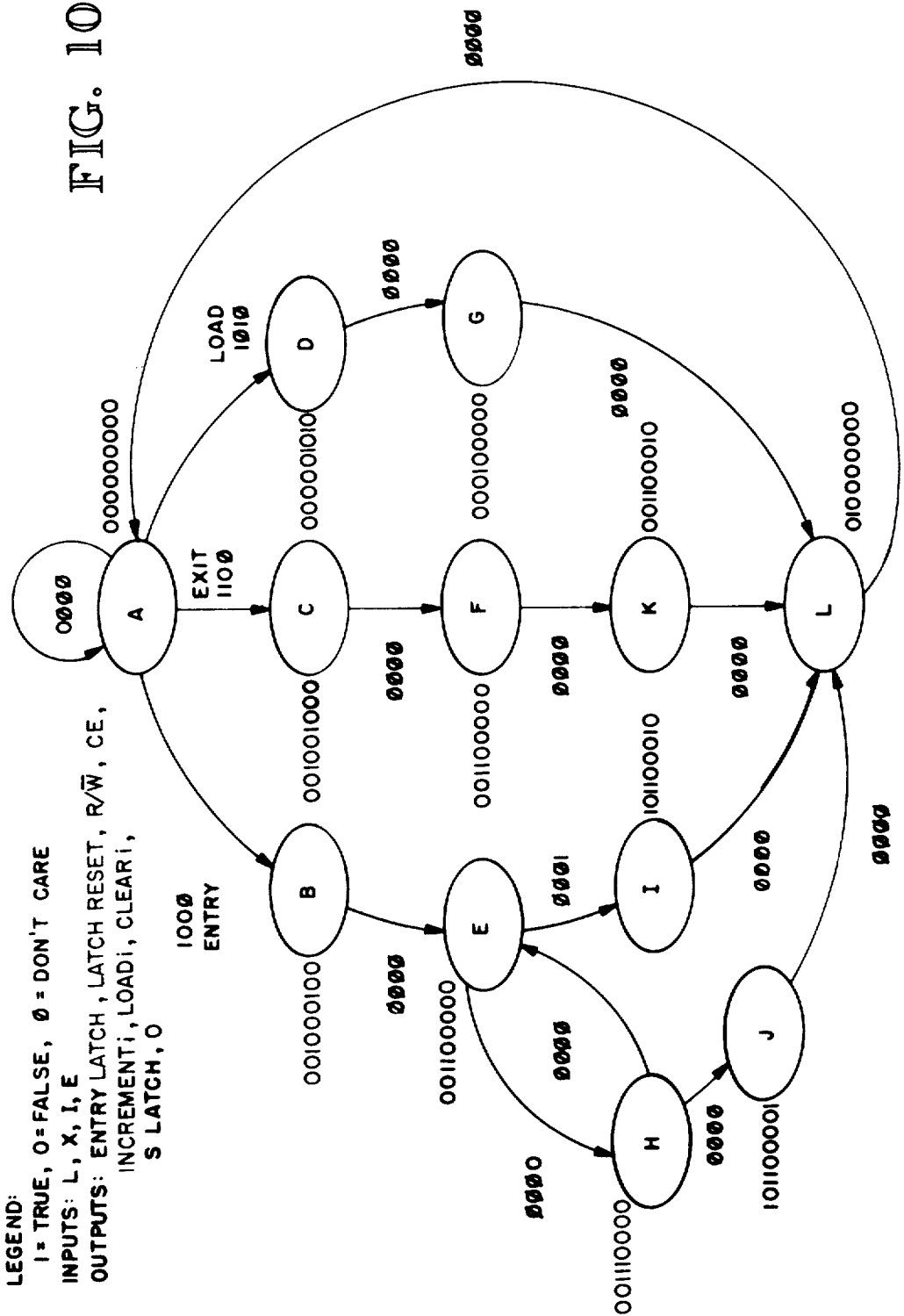

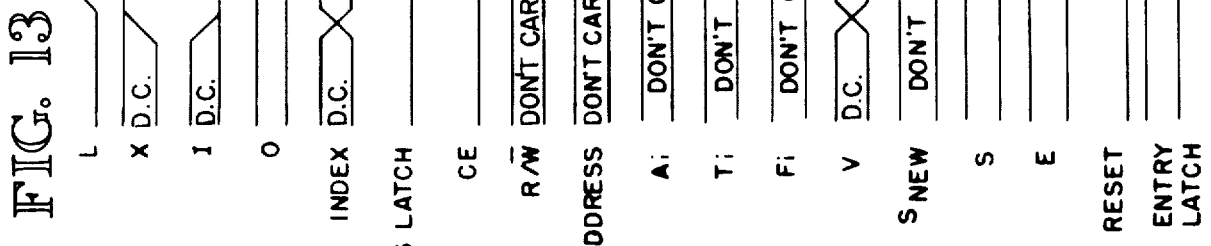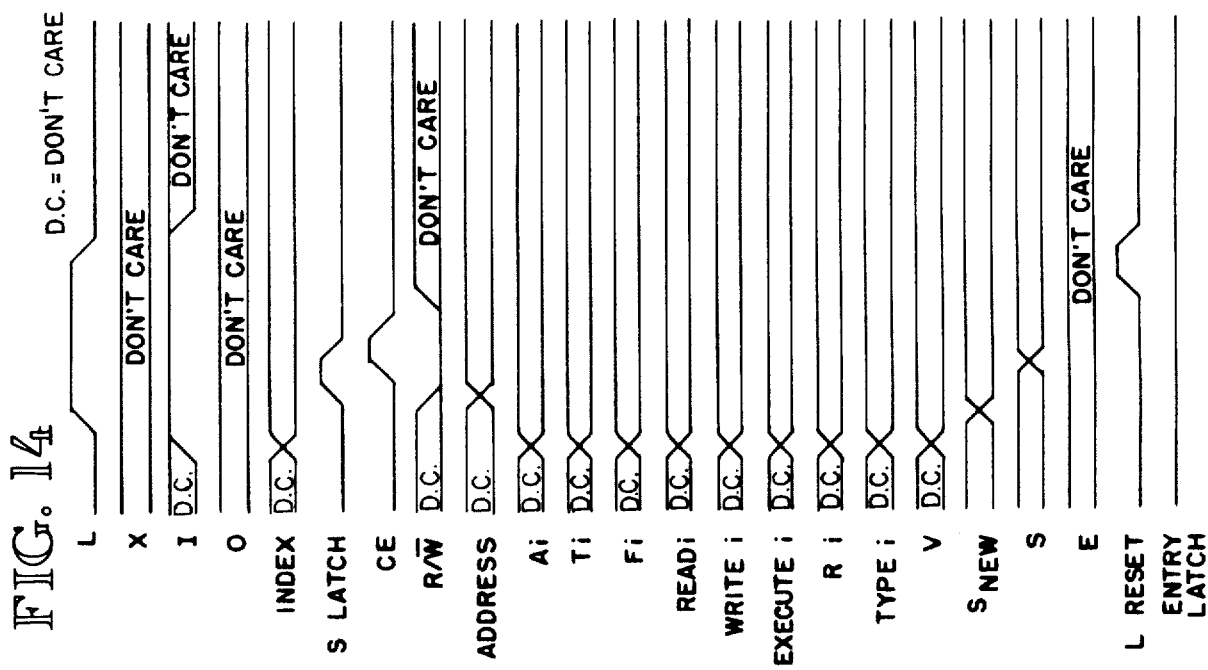

FIG. 21
STATUS SELECTION LOGIC
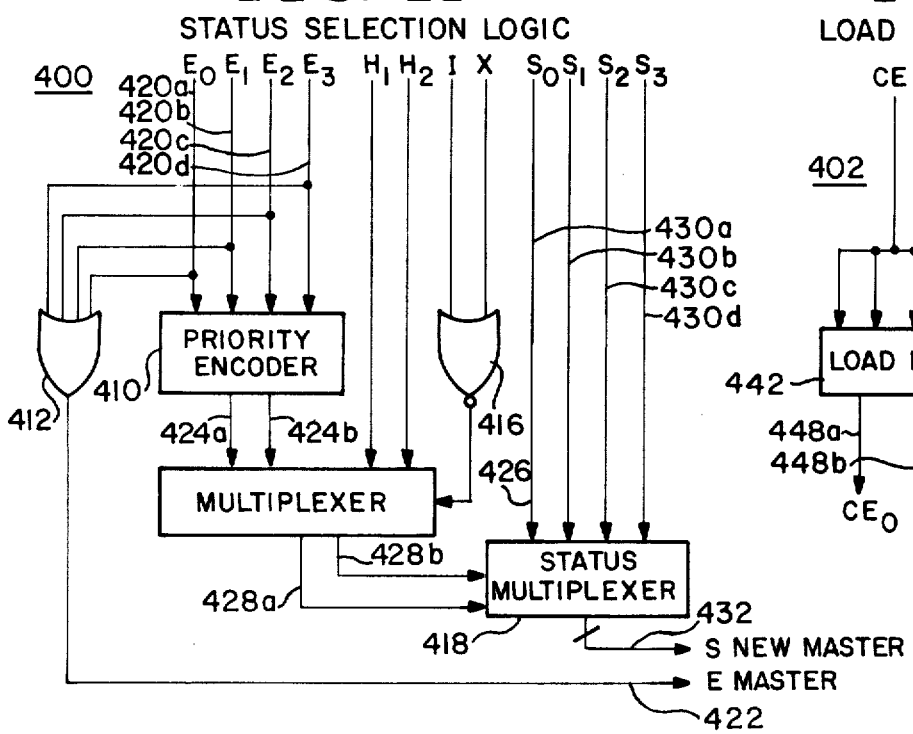
FIG. 22
LOAD CONTROL LOGIC
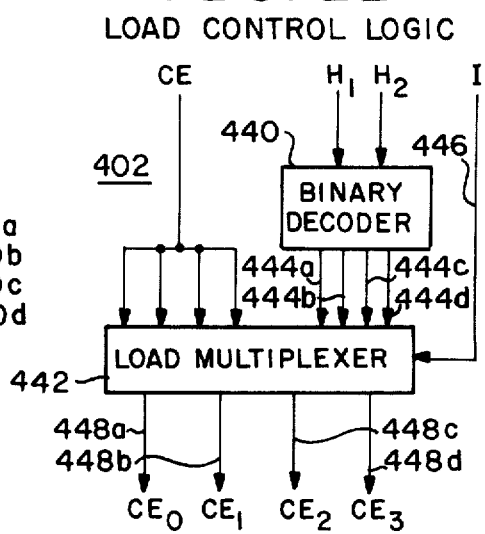
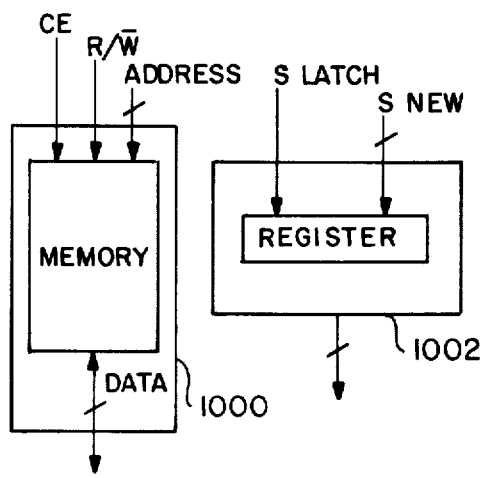
FIG. 17
DATA CONSTRUCTS COMPONENTS
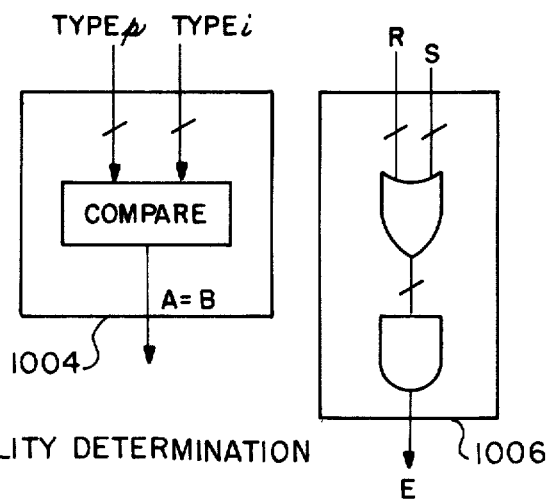
FIG. 18
PROCEDURE ELIGIBILITY DETERMINATION LOGIC COMPONENTS

MODULAR SYSTEM CONTROLLER FOR A TRANSITION MACHINE

TABLE OF CONTENTS

Background of the Invention
  Field of the Invention
  Description of the Prior Art
Summary of the Invention
Brief Description of the Drawings
Detailed Description of the Preferred Embodiments
  Transition Machines
  System Controller and Interface
System Controller Functional Operation—Detailed Description
  Entry Transition
  Exit Transition
  Load Transition
System Controller Detailed Component Design
  Data Constructs
  Procedure Eligibility Determination Logic
  System Status Update Logic Circuit
  Synchronization and Control Logic Circuit
System Controller Internal Operation
Modular Construction of System Controller
  Modular Disjoint Expansion
  Modular Cojoined Expansion
    Horizontally Expanded System Controller
    Vertically Expanded System Controller
Appendix A
Appendix B
Appendix C

BACKGROUND OF THE INVENTION

1. Field of the Invention

The invention is in the field of modular parallel computer architecture and in particular a modular embodiment of the System Controller of a transition machine.

2. Description of the Prior Art

Transition machines are general purpose computers with extensive multiprocessing capabilities. The basic architectural philosophy and design of such machines is described in copending application Ser. No. 38,292, filed May 11, 1979 and entitled "Transition Machine—A General Purpose Computer", assigned to the same assignee as herein, now U.S. Pat. No. 4,319,321. A related invention for providing increased data security utilizing a transition machine is described in copending application Ser. No. 091,877, filed Nov. 7, 1979 and entitled "Secure Implementation of Transition Machine Computer", now U.S. Pat. No. 4,328,542. The whole of both of these aforementioned applications is incorporated herein by reference.

The System Controller is a hardware device which performs the basic control function for the transition machine. The System Controller contains all data constructs and logic required to control the multiprocessing system. In the embodiments described in the aforementioned applications, multiprocessor access contention over the System Controller results in reducing some of the overall system throughput since usable processor time is wasted in waiting for access contention to be resolved. The larger the number of data processors, the more significant are the access contention problems. Furthermore, the size and dimensions of the System Controller's data constructs for a given system are not easily determined prior to the software development and vary considerably from system to system. In addition, these capacities must be increased commensurably with modular increases in processing capacity. A fixed size data construct memory within the System Controller provides considerable constraints to the programmer and inhibits software development and maintenance. These disadvantages of the transition machines have been overcome by the utilization of a multiple disjoint System Controllers and/or a modularly expanded implementation of the System Controller as described hereinbelow.

SUMMARY OF THE INVENTION

It is an object of the invention to provide a modular embodiment for the system controller of a transition machine wherein the computational capacity of the transition machine may be increased by addition of modular units of the system controller.

The invention may be characterized as a modular hardware executive apparatus for use in a multiprocessing system to achieve concurrent operation of a plurality of data processors for solving computational problems defined by a plurality of application programs and corresponding control programs. The data processors access the plurality of application programs which are stored in application program memory storage means and further access data which is stored in data memory storage means. The data memory storage means have at least a common data memory area which is accessible by the plurality of data processors. The hardware executive apparatus executes the control programs and comprises at least one status storage means for storing binary status indications $S_j$ corresponding to data conditions on a data set appropriate for determining eligibility of the application programs solving the computational problem; a plurality of modular units, each unit including a relevance storage means for storing groups, i, of binary relevance indications $R_{ij}$, each group corresponding to the relevance of at least some of the status indications to the $i^{th}$ one of the application programs, where i is an integer designating one of the groups and corresponding one of the application programs and j is an integer designating one of the binary status indications; means for updating the status indications stored in the status storage means at the completion of execution of $i^{th}$ application program; means responsive to at least one of the relevance storage means and at least one status storage means for determining the eligibility of at least some of the application programs for execution by the plurality of processors; and means for enabling execution of eligible application programs by the plurality of processors. In this manner at least some of the application programs which are determined eligible may be executed concurrently.

In a first embodiment of the invention, the computing system is utilized for solving a plurality of disjoint computational problems. The computing system comprises a plurality of data processors, a plurality of system controller modular units and an interface means connected between the plurality of data processors and the plurality of system controller modular units. The plurality of data processors access application programs stored in application program memory storage means and access data stored in data memory storage means. The application programs correspond to the disjoint computational problems and the data memory storage means has at least a data memory area for each of the disjoint computational problems which is commonly accessible by the plurality of data processors. The plurality of system controller modular units are each operable for controlling execution of a plurality of application programs which correspond to different ones of the disjoint computational problems. Each modular unit comprises (1) a status register for storing binary status indications $S_j$ of a plurality of unary predicates of data conditions appropriate for the disjoint computational problem, (2) a relevance matrix store for storing binary indications $R_{ij}$ of the relevance of each unary predicate j to each application program i of the corresponding plurality of application programs, (3) means for updating the binary status indications of the status register in response to changes of the binary status of the unary predicates upon execution of each application program i, (4) means for storing a plurality of application program designation addresses corresponding to each application program i, (5) means for determining the eligibility of each application program i for execution by the plurality of data processors and for generating designation addresses from the application program designation address storage means for application programs determined to be eligible, and (6) synchronization and control logic means for synchronizing and controlling operation of the system controller modular units.

In another embodiment of the invention a modular computing system comprises (a) a plurality of data processors accessing application programs stored in application program memory storage means and data stored in data memory storage means wherein the data memory storage means has at least a data memory area commonly accessible by the plurality of data processors, (b) a plurality of Z modular units, wherein each modular unit includes a status register for storing M binary status indications of M data conditions appropriate for partially determining the eligibility of the application programs stored in the application program memory storage means (Z and M being integers), a relevance matrix store for storing binary indications of the relevance of each of the M data conditions to each of the application programs, and means for updating the M binary status indications of the status register in response to changes of the binary status of the data conditions upon execution of the application programs, (c) means for storing a plurality of application program designation addresses corresponding to the application programs, (d) means for determining the eligibility of the application programs for execution by the plurality of data processors, wherein the eligibility determining means is responsive to the ZM binary status indications of the Z status registers and the corresponding ZM binary relevance indications of the Z relevance matrix stores, (e) logic circuit means for synchronizing and controlling the modular units wherein the logic circuit means is operative in cooperation with the application program designation address storing means for generating designation addresses for application programs determined to be eligible, and (f) interface means for interconnecting the Z modular units and the logic circuit means with the plurality of data processors. The interface means receives the designation addresses and stores them for access by the plurality of data processors whereby a plurality of eligible programs may be executed concurrently and whereby Z modular units may be utilized in the computing system for increasing the number of data conditions for a computational problem to be solved by the computing system.

In another embodiment of the invention a modular computing system comprises a plurality of data processors, a system controller and interface means. The plurality of data processors accesses application programs stored in application program memory storage means and data stored in data memory storage means. The data memory storage means has at least a data memory area commonly accessible by the plurality of data processors. The system controller comprises a status register, a plurality of Z modular units, means for determining eligibility of the application programs and logic circuit means for synchronizing and controlling the modular units. The status register stores M binary status indications of a plurality of M data conditions appropriate for determining the eligibility of up to ZN application programs which are stored in the application program memory storage means. Z, M and N are integers and ZN is greater than or equal to the number of application programs stored in the application program memory storage means and utilized for solving a computational problem. The plurality of Z modular units each include a relevance matrix, updating means and designation address storing means. The relevance matrix stores binary indications of the relevance of each of the M data conditions to each of as many as N application programs. The relevance indications are different from one modular unit to another and correspond to different groups of application programs wherein each group has as many as N application programs. The updating means updates the binary status indications of the status register in response to changes of the binary status of the data conditions upon execution of the application programs. The storing means stores up to ZN application program designation addresses corresponding to the application programs. The eligibility determining means determines the eligibility of the up to ZN application programs for execution by the plurality of data processors. The eligibiilty determining means is responsive to the M binary status indications of the status register and the M corresponding binary relevance indications of the relevance matrix store. The synchronizing and controlling logic means synchronizes and controls the modular units. The logic circuit means is operative in cooperation with the application program designation address storing means for generating designation addresses for application programs which are determined to be eligible. The interface means interconnects the Z modular units and the logic circuit means with the plurality of data processors. The interface means receives the designation address and stores them for access by the plurality of data processors. In this manner, a plurality of eligible programs may be executed concurrently, and any number of Z modular units may be utilized in the computing system for increasing the number of application programs utilized for solving a computational problem.

BRIEF DESCRIPTION OF THE DRAWINGS

These and other objects of the invention will become clear in reference to the foregoing specification taken in conjunction with the drawings wherein:

FIG. 4 is a block diagram of the data construct section of the system controller;

FIG. 5 is a schematic diagram of the procedure eligibility determination logic circuit of the system controller;

FIG. 6 is a block diagram of logic circuit nomenclature utilized in the drawings;

FIG. 10 is an illustration of the state diagram for use in implementing the synchronization and control logic circuitry;

FIG. 13 is a timing diagram illustrating an exit transition;

FIG. 14 is a timing diagram illustrating a load transition;

FIG. 17 is a block diagram of data construct components;

FIG. 18 is a block diagram of procedure eligibility determination logic components;

FIG. 21 is a schematic diagram of the status selection logic of FIGS. 20A and 20B; and FIG. 22 is a schematic diagram of the load control logic of FIGS. 20A and 20B.

DETAILED DESCRIPTION OF THE PREFERRED EMBODIMENTS

Transition Machines

Figure 1:
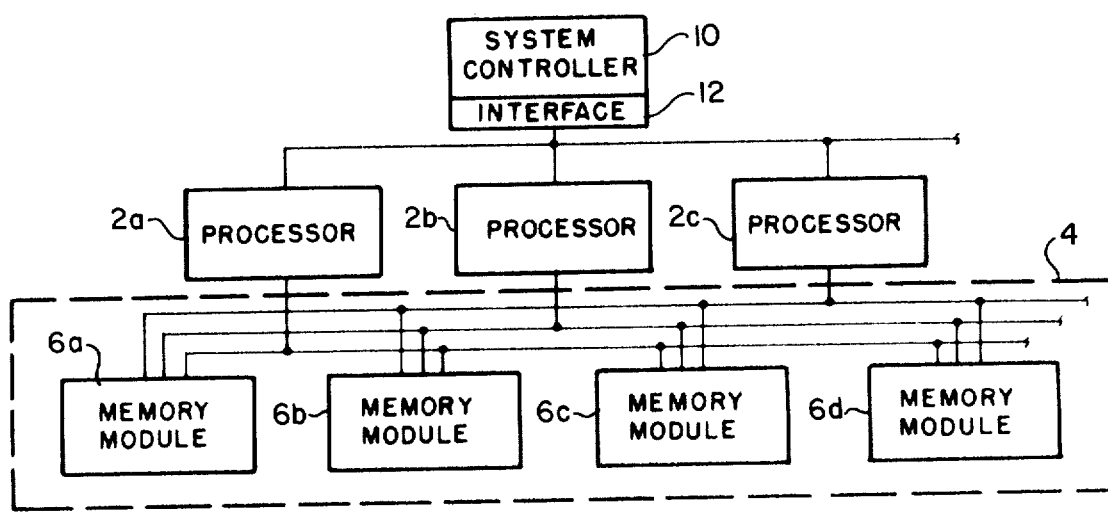
FIG. 1 is a block diagram of the transition machine.

An overall block diagram of a transition machine 1 is shown in FIG. 1. The transition machine 1 is seen to comprise a plurality of processors 2a, 2b, 2c each connected to a common memory 4. While only three processors are shown, a large number of processors may be used including I/O controllers and other special purpose processors. Further, the common memory 4 is typically composed of a plurality of memory modules 6a, 6b, 6c, 6d of which only four are illustrated. Each memory module may provide storage means for data as well as for application programs, or additional memory modules may be provided for such purposes as desired. For the multiprocessor embodiment, however, at least some data storage areas are made commonly accessible to the plurality of data processors. It is also understood that some of the processors may in fact be I/O processors or controllers connected in conventional fashion to one or more I/O devices.

A System Controller 10 is shown connected to the processors 2 via a processor/system controller interface 12. The System Controller 10 forms the heart of the invention and is more fully described hereinafter. In practice, the processors 2 and common memory 4 may be of conventional hardware design. The System Controller 10 is utilized, together with interface 12, to dispatch activities to the processors 2 and to achieve concurrent operation of the processors 2, in a multiprocessor system. The System Controller 10 is thus similar in function to a multiprocessor software system executive. The modular expansion of the System Controller 10 described herein enables the transition machine to achieve a high degree of versatility together with extremely low overhead.

Figure 2:
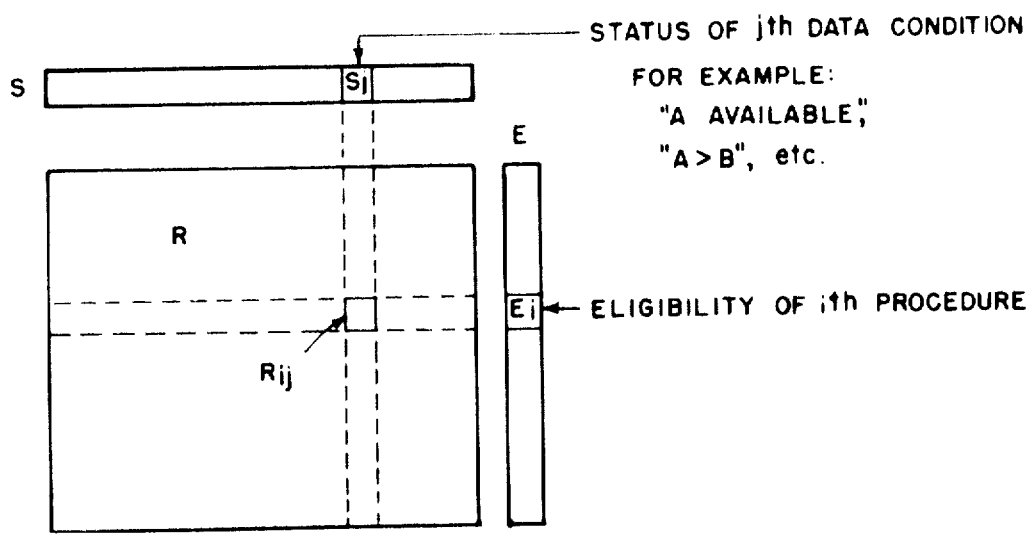
FIG. 2 is an illustration of the primary data constructs utilized in the system controller.

FIG. 2 illustrates the primary data constructs used in the System Controller. The mathematical treatment of transition machines is set forth in the appendices and is given in detail in the above-referenced copending application Ser. No. 38,292. The present discussion of FIG. 2 is only a summary for ease of explanation of the modular expandability concepts of the invention.

In reference to FIG. 2, it may be seen that a system status vector S is defined to have binary status indications $S_j$ on a global set of data conditions, e.g. unary predicates such as "the data element A is available" or "$A > B$". A relevance matrix $R_{ij}$ is defined to indicate the relevance of the data condition j to the $i^{th}$ procedure (hereinafter, subsystem). The eligibility $E_i$ of subsystem i is determined by the dot product of R and S, namely, a subsystem is eligible if and only if all of the data conditions (defined by $S_j$) which are relevant (defined by $R_{ij}$) for the subsystem i are met. Only eligible subsystems may be executed by processors 2.

System Controller and Interface

Figure 3:
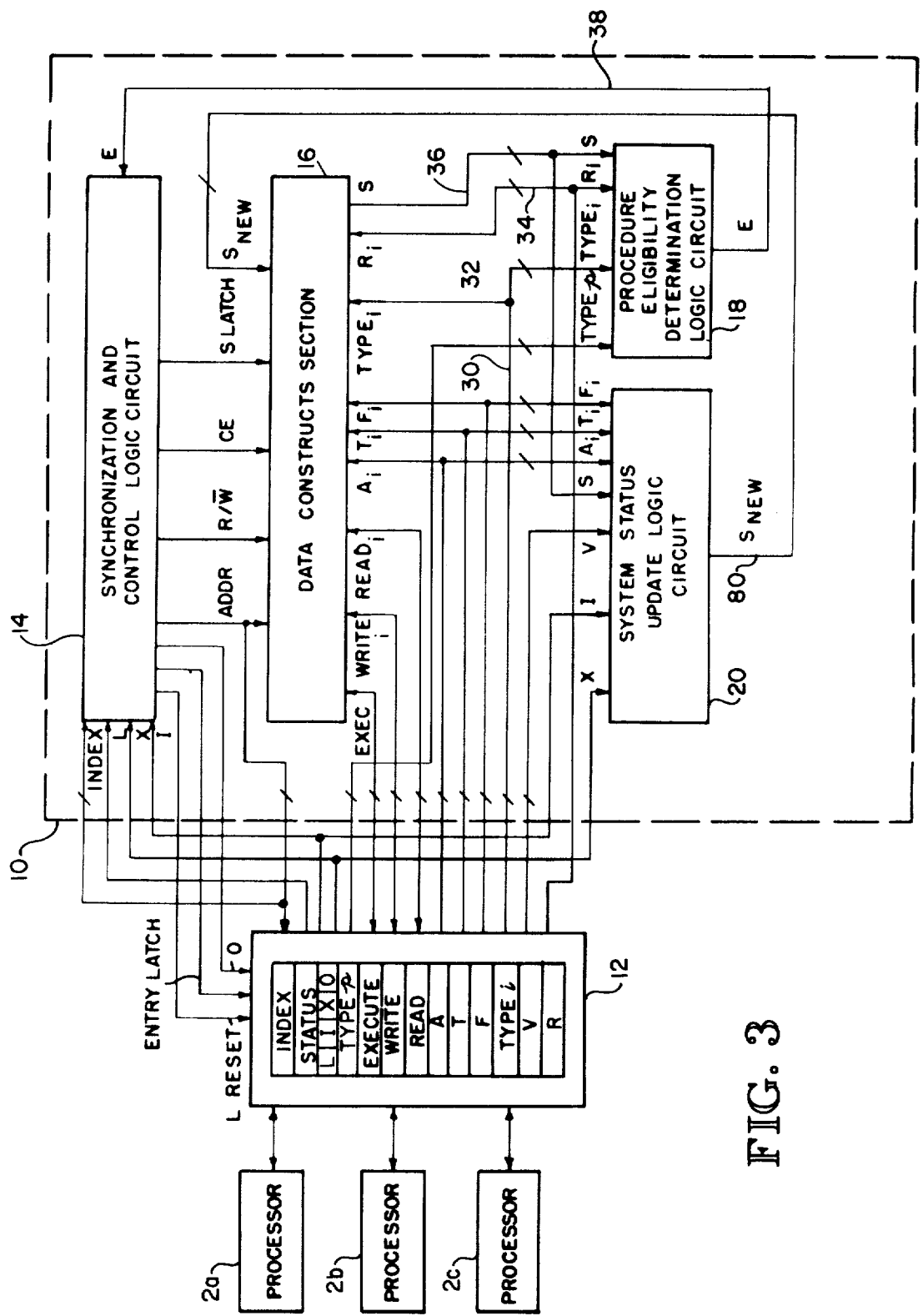
FIG. 3 is an overall block diagram of the major components of the transition machine structure.

FIG. 3 illustrates a block diagram of a specific implementation of the System Controller 10 and interface 12 of the transition machine 1 as described in the aformentioned copending application Ser. No. 38,292. The System Controller 10 is seen to comprise a synchronization and control logic circuit 14, a data constructs section 16, a procedure eligibility determination logic circuit 18 and a system status update logic circuit 20. FIG. 3 also shows the interconnection of each of these major circuit blocks with each other and with the processor/system controller interface 12.

The processor/system controller interface 12 consists of a number of data and control registers accessible to both the processors 2 and the System Controller 10. The structure and use of these registers are set forth in the following Table 1.

TABLE I

| Descriptor | Definition |
|---|---|
| STATUS | - a 4-bit read/write register whose bits are labeled L, I, X and O, and which contains the following synchronization, protocol and mode request information: |
| | L - a binary status indicator used to prevent the processors from accessing the system controller interface registers while a system transition is in progress. When a processor requests a system transition, it loads the appropriate data values in the X, INDEX, TYPE and V registers and sets the L discrete true. This requests execution of the System Controller which resets the L discrete (sets it false) when the re- |

TABLE I-continued

| Descriptor | Definition |
|---|---|
| | quired transition is completed. |
| I | - a binary status indicator used to indicate to the System Controller whether a normal or load transition is being requested. The I flag is set true by the processor when the system transition required is a load transition. The I bit remains true until the processor resets it upon load completion. |
| X | - a binary status indicator used to indicate to the System Controller whether an entry or exit system transition is requested. The X flag is set true by the processor when the system transition required is the result of a subsystem exiting, and X is set false by the processor for a subsystem entry transition. During a load transition X is ignored. |
| O | - a binary status indicator set by the System Controller to notify the processor that no subsystem is currently eligible. The O bit is set true by the System Controller when an entry transition results in no eligible subsystem. The O bit is set false by the System Controller when an entry transition results in an eligible subsystem. The O bit is ignored on exit and load transitions. |
| $TYPE_p$ | - a register used to contain the type indentification of the $p^{th}$ processor. The System Controller uses this register to select the next eligible subsystem appropriate to the requesting processor. $TYPE_p$ is fixed for a given processor with its processor category. During entry transitions the System Controller returns the EXECUTE, READ, WRITE, and INDEX values associated with an eligible subsystem, whose type is a compatible category with the value contained in the $TYPE_p$ register. $TYPE_p$ is ignored during subsystem exit and load transitions. |
| INDEX | - a register used to contain the indentification of either the next eligible subsystem, the row currently being loaded, or the subsystem currently being exited depending upon the type of transition being requested. At the completion of each subsystem entry transition, the System Controller loads INDEX with the index of the next eligible subsystem whose type is of a compatible category with the value contained in the $TYPE_p$ register for the processor. During a load transition, INDEX is loaded by the processor with the System Controller row number for the row of constructs currently being loaded. When a subsystem exit transition is requested, INDEX will contain the subsystem identification provided to it by the System Controller at completion of the entry transition. Processor interrupts are forwarded to the System Controller by an exit transition using an INDEX value dedicated in the System Controller for that purpose. In certain of the implementations disclosed herein, the INDEX register value will be treated as though it were composed of two separate values, where the most significant bits in the register indicate the specific System Controller identification, and the least significant bits indicate the specific subsystem index within that particular system controller. |
| EXECUTE | - a register used to provide the entry point of the subsystem whose identification is in INDEX. This register is loaded by the System Controller and is read by the processors during subsystem entry transitions. EXECUTE is loaded by the processor and read by the System Controller during a load transition. During exit transitions EXECUTE is unused. |
| READ | - a register used to provide the pointer(s) to the global data item(s) accessible to the associated subsystem in a read capacity. READ is loaded by the System Controller during an entry transition and is loaded by the processor during a load transition. READ is unused during an exit transition. |
| WRITE | - a register which provides the pointer(s) to the global data item(s) accessible to the associated subsystem in a write capacity. WRITE is loaded by the System Controller during an entry transition and is loaded by the processor during a load transition. WRITE is unused during an exit transition. |
| V | - a register used to provide the variable update vector loaded by the processor upon completion of a subsystem. This vector allows a subsystem to return variable data conditions to the system status vector. (For the specific implementation described in the appendices, this allows the subsystem to modify only selected data elements of the S vector since any attempt to modify unauthorized elements will be masked out by the T and F vectors, stored internally to the System Controller). During a load transition V is loaded by the processor with the new S vector to be loaded in the S register. V is unused during an entry transition. |
| $TYPE_i$ | - a register used to contain the type of processor required to execute the $i^{th}$ subsystem. During a load transition $TYPE_i$ is loaded by the processor with |

TABLE I-continued

| Descriptor | Definition |
|---|---|
| | the processor category required by the subsystem whose row of data constructs is being loaded into the System Controller. TYPE$_i$ is unused during entry and exit transitions. |
| A | - a register which provides a method for the processor to load the System Controller A matrix. During load transition the A register contains the vector to be loaded in the row of the System Controller's A matrix specified by INDEX. The A register is unused during entry and exit transitions. |
| T | - a register used to provide a method for the processor to load the System Controller's T matrix. During load transitions the T register contains the vector to be loaded in the row of the System Controller's T matrix specified by INDEX. The T register is unused during entry and exit transitions. |
| F | - a register which provides a method for the processor to load the System Controller's F matrix. During load transitions the F register contains the vector to be loaded in the row of the System Controller's F matrix specified by INDEX. The F register is unused during entry and exit transitions. |
| R | - a register which provides a method for the processor to load the R matrix of the System Controller. During load transitions the R register contains the vector to be loaded in the row of the System Controller's R matrix specified by INDEX. The R register is unused during entry and exit transitions. |

For each System Controller there is one set of interface data and control registers as described above. To insure proper operation of each System Controller, no processor may modify these registers while the System Controller is active (i.e., if the L bit in the STATUS register is true). The processors also must be synchronized so that only one processor modifies these registers at a time. This can be accommodated in various ways, for example, a binary semaphore can be employed to avoid the critical section problem and synchronize the processors. Alternatively, a multiport organization can be employed where each processor has a dedicated set of interface registers and a multiport controller resolves multiple processor access contention. The multiport controller performs the actual data transfer between the dedicated processor interface registers and the actual system controller registers (similar to the operation of a multiport memory controller). Because of this the processor interface procedures do not require synchronization precautions. The multiport controller implementation therefore accommodates a simpler interface description, and is utilized in the following description.

System Controller Functional Operation Detailed Description

There are basically three types of allowed processors/System Controller interactions, namely entry, exit and load transitions. For each type of interaction specific processor actions and System Controller responses are described below.

Entry Transition

When a processor is in an idle state requesting an activity, it will first wait until the logic segment of the System Controller is not busy which is indicated by the L bit in the STATUS register being set false. At that time it will store its processor type identification into the register, TYPE$_p$ (if not previously initialized). The X bit in the STATUS register will be set false to indicate a procedure entry is being requested, and the L discrete in the STATUS register will be set true to signal the System Controller to initiate a transition. The processor will then wait until the System Controller has completed its operation which is indicated by the L discrete in the STATUS register being reset false by the System Controller.

When the System Controller detects that a transition is to be initiated (by the L bit in the STATUS register having been set), it will determine whether the entry, exit, or load transition has been specified. If the entry transition is specified, the matrix dot product is performed with the S vector and the R matrix to obtain the next eligible procedure of a type compatible with the processor TYPE$_p$ register. If such an eligible procedure is determined its index is stored in the INDEX register, the procedure access pointer is stored in the register EXECUTE, and the data access pointers are stored in the registers READ and WRITE. The active protection specification for the procedure (the A vector) is used to update the system status vector to preclude inappropriate simultaneous execution of the same procedure in another processor. If no eligible procedure exists for the processor, the System Controller will set the 0 bit in the STATUS register true. In this case the system status vector remains unchanged. Access authorization to the interface registers is returned to the processor by resetting the L discrete in the STATUS register.

When the processor detects that access authorization has been given by the L bit of the STATUS register being set false, it first checks to see if any procedures are eligible. This is accomplished by examining the 0 bit in the status register. If the 0 bit is true, indicating no procedures are currently eligible, the processor puts itself into procedure entry mode and reinitiates the entry sequence. If the 0 bit is false, indicating a procedure is eligible, the READ and WRITE registers are obtained to set up the data access linkages, and the EXECUTE register is obtained to set up control linkages. Control is passed to the specified procedure using the EXECUTE register value. The procedure may (in addition to whatever data processing activities are appropriate to it) compute a V register value.

Exit Transition

When a procedure exits, the processor will copy its V register value into the V register of the system controller interface, and set the exit discrete X, in the STATUS register true to indicate a procedure is being exited. The processor will then activate the System Controller by setting the L discrete in the STATUS register true, and set itself into an entry request mode.

When the System Controller detects that a transition is to be initiated (by the L discrete in the STATUS register having been set), it will determine whether the entry, exit, or load transition has been specified. If the exit transition is specified, the value in the INDEX register is used to index into the data constructs, providing the data to incorporate the change in the system status vector caused by the exit procedure. The V register is accessed to perform this update. Then the System Controller indicates its readiness to honor further requests by resetting the L discrete in the STATUS register.

Load Transition

When a load transition is initiated under software control, the processor will first wait until the logic segment of the System Controller is not busy (indicated by the L discrete in STATUS being set false). At that time the processor will store in the INDEX register the number of the row in the System Controller matrices which is to be loaded. The data to be loaded into each of the EXECUTE, READ, WRITE TYPE$_i$, A, T, F, and R matrices will be placed into the corresponding interface registers and the initial S vector will be placed in the V register. The load procedure is essentially an application program that transfers the System Controller data constructs from processor main memory to the System Controller. The processors sets the I discrete in the STATUS register true to indicate a load transition is being initiated and then activates the System Controller logic by setting the L discrete true in the STATUS register. The processor then resets itself into any one of the transition modes, entry, exit, or load depending on which transition is required. (It should be noted that the load procedure assumes there are no entry or exit transitions being performed for other processors. This can be guaranteed by assuming a load procedure is entered as the last eligible activity in the data constructs, when all processors are idle. Initializing S=0 will guarantee this status until load complete, at which time the initial S vector is passed.)

SYSTEM CONTROLLER DETAILED COMPONENT DESIGN

As shown in FIG. 3, the System Controller 10 is comprised of a synchronization and control logic circuit 14, a data constructs section 16, a procedure eligiblity determination logic circuit 18, and a system status update logic circuit 20. A specific detailed design for each of these four components is described below.

Data Constructs

As shown in FIG. 4, the data constructs section 16 of the System Controller 10 contains the System Controller memory. The memory may comprise eight random access memory modules, one for each of the R, A, F, T, TYPE$_i$, EXECUTE, READ, and WRITE arrays. Each element (row) of the R, A, F, and T arrays contains the same number of bits, which is equal to the number of bits which comprise the system status register.

It is not essential that memory word widths and individual array word-widths be identical as will become apparent. Depending on the machine application and the organization of the System Controller memory load logic, these memories can be either read only (ROM, PROM, etc.) or read/write. For purposes of illustration, read/write memories are utilized which are loaded by the processors.

There are a total of 14 input/output interfaces for the data constructs section 16, each of which is described in the following Table II.

TABLE II

| | DEFINITION |
|---|---|
| ADDRESS | - a multiple bit address bus that is capable of addressing each element of the R, A, T, F, TYPE$_i$, READ, WRITE, and EXECUTE arrays. The arrays are addressed concurrently, e.g., if ADDRESS = 2 then the second element of each array is addressed. |
| CE | - a one bit signal that enables the eight memory modules to be read or written. When CE is true (i.e., logical 1) the contents of each array element indicated by ADDRESS is read (R/$\overline{W}$ = "1") or written (R/$\overline{W}$ = "0") to or from the associated data bus. When CE is false (i.e., logical "0") no array can be read or written. |
| R/$\overline{W}$ | - a one bit signal input to each of the eight memory modules that specify a read or write action. When R/$\overline{W}$ is true (i.e., logical "1") and CE is true (i.e., logical "1") the contents of the array element indicated by ADDRESS is output on the corresponding data bus. When R/$\overline{W}$ is false (i.e., logical "0") and CE is true (i.e., logical "1") the contents of each data bus is written into associated array element specified by ADDRESS. |
| S$_{NEW}$ | - a multibit data input to the read/write S register. S$_{NEW}$ contains the updated status vector returned by the system status update logic as the result of an entry, exit or load transition. |
| S$_{LATCH}$ | - a control signal which, when enabled (transitions from logical "0" to logical "1"), causes the contents of S$_{NEW}$ data input to be latched into the S register. When S$_{LATCH}$ is disabled (logical "0") the contents of the S register remains unchanged independent of changes in S$_{NEW}$. |
| R$_i$ T$_i$ F$_i$ A$_i$ EXECUTE$_i$ READ$_i$ WRITE$_i$ TYPE$_i$ | - multiple bit, bidirectional data buses. Data from each of the eight memory modules are output to (or input from) the associated data buses. |
| S | - a multiple bit bus on which the contents of the S register is output. |

Procedure Eligibility Determination Logic

The procedure eligibility determination logic circuit 18 is contained within the System Controller 10 and contains the combinational logic necessary to determine procedure eligibility during entry transitions. A subsystem is eligible if the type of processor making the request (content of the TYPE$_p$ interface register) is equivalent to the processor type required by the selected subsystem (content of the TYPE$_i$ data bus), and all data conditions in the S vector relevant to enabling the subsystem are true (i.e., the vector resulting from forming the logical "OR" of the ith row of the R array and the current system status vector, S, contains all ones).

FIG. 5 is a block diagram of the procedure eligibility determination logic. In reference to FIG. 3 and FIG. 5, line 30 represents a multiple bit data bus which contains the current contents of the TYPE$_p$ register in the processor/system controller interface 12. Line 32 is a multiple bit data bus which contains the processor type associated with the subsystem currently indexed, namely, TYPE$_i$. Line 34 represents a multiple bit data bus which contains the R vector associated with the subsystem currently indexed, namely, R$_i$. Line 36 is a multiple bit data bus from the S register of the data constructs section 16 (FIG. 4) which feeds the current contents of the S register to the procedure eligibility determination logic circuit 18. The output of the circuit 18 is a single data bit representative of a single component of the eligibility vector E along output line 38. E is logical "1" when the indexed subsystem is eligible and logical "0" otherwise. The logical expression for E may be written as follows:

$$E = (TYPE_p \odot TYPE_i) \wedge \left( \bigwedge_{j=1}^{J} (S_j \vee R_{ij}) \right)$$

Where the symbol $\odot$ is used to denote logical equivalence, and $$\bigwedge_{j=1}^{J}$$

denotes the logical "AND" of each element of the vector operated on resulting in a single signal that will be true (i.e., logical "1") if and only if all elements in the vector are true, e.g., $$\bigwedge_{j=1}^{J} X_j = X_1 \wedge X_2 \wedge X_3 \wedge \ldots X_J$$

$\wedge$ = logical "AND".

The logic circuitry of FIG. 5 implements the above equation. In reference to FIG. 5 the signal along data bus lines 30 and 32 are fed to a multibit comparator 40 which produces a single output bit along line 42. The output bit is a logical 1 only if the data on the TYPE$_p$ data bus (line 30) is idential to the data on the data bus (line 32) corresponding to TYPE$_i$ (all bits equivalent), and otherwise the output along line 42 is a logical 0. The data bits along bus lines 34 and 36 are input to an OR gate which is represented in FIG. 5 by a single conventional OR symbol. It is understood, however, that each of the corresponding bits along lines 34 and 36 are separately OR'ed similar to the circuit shown in FIG. 6. The line running traverse of the input and output lines of the logical OR thus indicate the multiple OR circuit of FIG. 6. AND circuits are similarly represented in the drawings, e.g., FIG. 7. The definition utilized in the circuit design is such that S$_j$=1 if the j$^{th}$ data condition is true, and R$_{ij}$=0 of the j$^{th}$ data condition is relevant to procedure i. Consequently, the OR, AND sequential logic is appropriate. Thus, in reference to FIG. 5, the multiline output of OR gate 46 is fed to a corresponding multiple input AND gate 48 which provides a single output along line 50 to AND gate 52. A second input of AND gate 50 is derived from the output of comparator 40 along line 42.

System Status Update Logic Circuit

The system status update logic circuit 20 contains the combinational logic required to perform updates to the system status vector, S, appropriate to the transition being initiated. During an entry transition, the logical expression for the S$_{NEW}$ vector generated is:

$$S_{NEW} = S_{OLD} \wedge \overline{A_i}$$

During an exit transition, the logical expression for the S$_{NEW}$ vector generated is:

$$S_{NEW} = (S_{OLD} \wedge T_i) \vee (A_i \wedge T_i) \vee (T_i \wedge \overline{F_i}) \vee (V \wedge \overline{F_i})$$

This expression is summarized by Table B.2 given in Appendix B. During the load transition, the logical expression for S$_{NEW}$ is:

$$S_{NEW} = V$$

Figure 7:
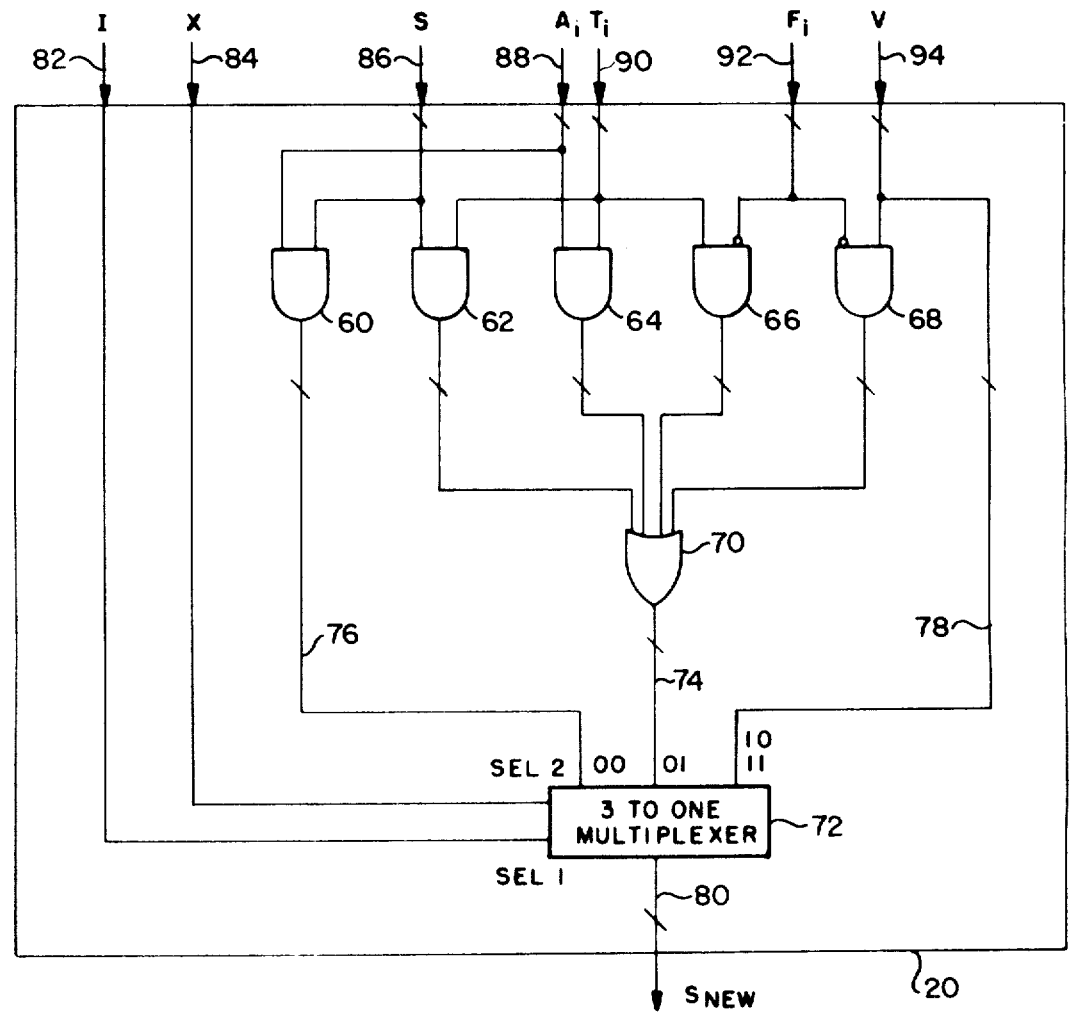
FIG. 7 is a schematic diagram of the system status update logic circuit of the system controller.

FIG. 7 is a block diagram of the system status update logic circuit 20. As shown in FIG. 7, the system status update logic circuit 20 comprises a plurality of OR and AND logic circuits (See FIG. 6 for clarification) identified by numbers 60, 62, 64, 66, 68 and 70. AND gates 64, 66, and 68 have one group of inverting input terminals and one group of non-inverting input terminals. Element 70 is a multiple input/output OR gate (see FIG. 6) wherein each input/output line is a multiple bit data bus. The output of OR gate 70 is fed to an input terminal of a 3-to-1 multiplexer 72 along lines 74. A second group of inputs to multiplex 72 is fed in along lines 76 from the output of AND gate 60. A third input is fed to multiplexer 72 along lines 78. The output of multiplex 72 is a data bus 80 representative of the new status vector S$_{NEW}$ and is fed to the S register of the data constructs section 16 (see FIGS. 3 and 4).

The inputs (generally data buses) to update circuit 20 are fed in along lines 82, 84, 86, 88, 90, 92 and 94. Line 82 carries the single bit I discrete value from the system STATUS register of the interface 12. Line 84 carries the single X bit from the STATUS register. These two signals determine the select code at terminals SEL1, SEL2 of the multiplexer 72. If I is true (SEL1=1) a load transition is indicated (regardless of X) and multiplexer 72 passes the current V vector from lines 94 and 78 to the output data bus 80. If I is false (SEL1=0) the S$_{NEW}$ output is determined by the value of the X bit of the STATUS register. If X is true, S$_{NEW}$ is shown by the logical equation set forth above. This logical equation is associated with an exit procedure and is achieved using the condition code 01 for SEL1, SEL2=01. Associated logic circuits include input lines 86, 88, 90, 92 and 94, AND gates 60, 62, 64, 66, 68 and OR gate 70.

When both X and I are false, SEL1, SEL2=0, 0, the new status vector is simply given by S$_{OLD} \wedge \overline{A_i}$ and corresponds to an entry transition using AND gate 60 and lines 76.

Synchronization and Control Logic Circuit

Figure 8:
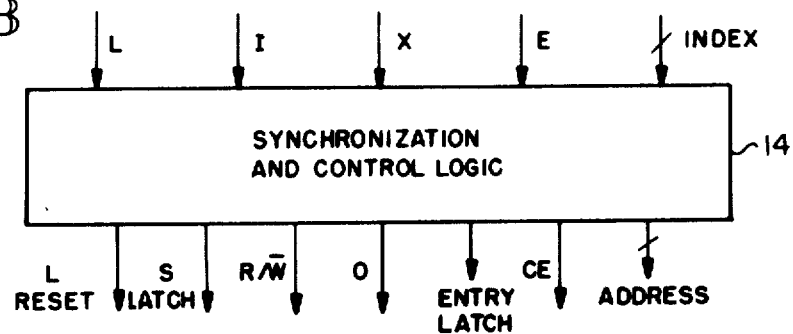
FIG. 8 is a block diagram of the input and output lines associated with the synchronization and control logic circuit of the system controller.

The synchronization and control logic circuit 14 contains the clocked sequential logic required to control the operation and internal connections of all the components of the System Controller. The various input and output lines associated with the logic circuit 14 are generally shown in FIGS. 3 and 8 with a detailed schematic diagram illustrated in FIGS. 9A and 9B. The function of the L, I and X bits of the STATUS register and the INDEX register of the interface 12 have been set forth above (see Table I for example). Similarly, ADDRESS, CE, R/W and S$_{LATCH}$ have already been defined (see, for example, Table II). These latter signals are all generated by the synchronization and control logic circuit 14 and fed primarily to the data constructs section 16. The ADDRESS bus is also latched into the INDEX register of the interface 12 during entry transitions when an eligible subsystem is detected.

Several additional signals are associated with the synchronization and control logic circuit 14. An ENTRY LATCH signal is a one bit control signal output by the synchronization and control logic circuit 14 to the processor interface registers. This signal causes the current values of the EXECUTE, READ, WRITE and the ADDRESS data buses to be latched into the EXECUTE, READ, WRITE and INDEX register in the processor interface 12. This signal is enabled only during entry transitions when an eligible subsystem is detected. The L RESET is a one bit control signal output by the synchronization and control logic circuit 14 to the processor interface registers. When enabled, this signal causes the L discrete of the processor interface STATUS register to be set false (i.e., logical "0"). The synchronization and control logic circuit 14 enables this signal at the completion of each transition. E is a one bit data signal input to the synchronization and control logic circuit 14 from the procedure eligibility determination logic circuit 18. This signal represents the eligibility (E="1") or non-eligibility (E="0") of the subsystem currently indexed. The E signal is used by the synchronization and control logic during entry transitions to detect an eligible subsystem.

A specific embodiment of the synchronization and control logic is shown in FIG. 9. Other logic combinational arrangements are possible with the design criteria simply being to reproduce the various outputs of FIG. 8 with the various possible combinations of the input variables L, I, X, E and INDEX. The state diagram is shown in FIG. 10. In FIG. 10, the symbol $\phi$ indicates a "don't care" condition. The design of the logic circuit from the state diagram may be done in accordance with well known techniques as set forth, for example, by M. M. Mano, *Computer Logic Design*, Prentice-Hall, Inc., (1972), pp. 200–236. The state assignments utilized in the logic design are as follows:

| State | J-K Flop Flop 120 | 122 | 124 | 126 | State | J-K Flip Flop 120 | 122 | 124 | 126 |
|---|---|---|---|---|---|---|---|---|---|
| A = | 0 | 0 | 0 | 0 | G = | 1 | 1 | 0 | 0 |
| B = | 0 | 0 | 0 | 1 | H = | 1 | 1 | 0 | 1 |
| C = | 0 | 0 | 1 | 0 | I = | 1 | 0 | 1 | 1 |
| D = | 0 | 1 | 0 | 0 | J = | 1 | 0 | 0 | 0 |
| E = | 1 | 0 | 0 | 1 | K = | 1 | 1 | 1 | 0 |
| F = | 1 | 0 | 1 | 0 | L = | 1 | 1 | 1 | 1 |

For implementing the state diagram four JK flip-flops 120, 122, 124 and 126 are used together with a clock generator 128 and loadable counter 130. With regard to the state assignments above, the most significant bit corresponds to flip-flop 120, the next most significant bit to flip-flop 122, etc. Counter 130 is loaded by the INDEX register from interface 12. The detail timing diagrams are illustrated in FIGS. 11–14 in reference to the design description set forth below.

System Controller Internal Operation

The System Controller has three internal modes of operation, one for each of the entry, exit and load transitions. During an entry transition (initiated by the L discrete of the interface STATUS register being set true) the synchronization and control logic circuit 14 begins accessing successive rows (i.e., each successive element of the eight memory modules) of the data construct matrix arrays, causing them to be output on their respective data buses. As each element is output, the subsystem eligibility determination logic circuit 18 computes the eligibility of the associated subsystems, and the system status update logic circuit 20 generates the S$_{NEW}$ vector based on the current system status vector and the A vector associated with the subsystem indexed. It will be recalled that the A vector is used to preclude inappropriate simultaneous execution of the same subsystem in another processor. If the subsystem is found eligible, the synchronization and control logic circuit 14 causes the S register to latch the S$_{NEW}$ vector, transfers access and control information (i.e., EXECUTE$_i$, READ$_i$, WRITE$_i$ and ADDRESS) from the associated data buses to the processor interface registers (i.e., into the EXECUTE, READ, WRITE and INDEX registers respectively), and returns access authorization to the processor by resetting the L busy discrete in the interface STATUS register. If no subsystem is found eligible the synchronization and control logic circuit 14 notifies the processor by setting the 0 discrete in the interface STATUS register and returns access authorization to the processor. In this instance, no system status vector update occurs.

Accessing successive rows of the R matrix and recycling to i=0 at each new entry transition enables the computer programmer to establish a priority application program sequence. Thus subsystems of a higher priority are placed earlier in the row sequence. It is noted however that such a sequential accessing is not required, and indeed, even a random accessing technique would be possible. An alternate approach which involves computing the matrix dot product in parallel as opposed to the sequential method described above is also possible.

Figure 11:
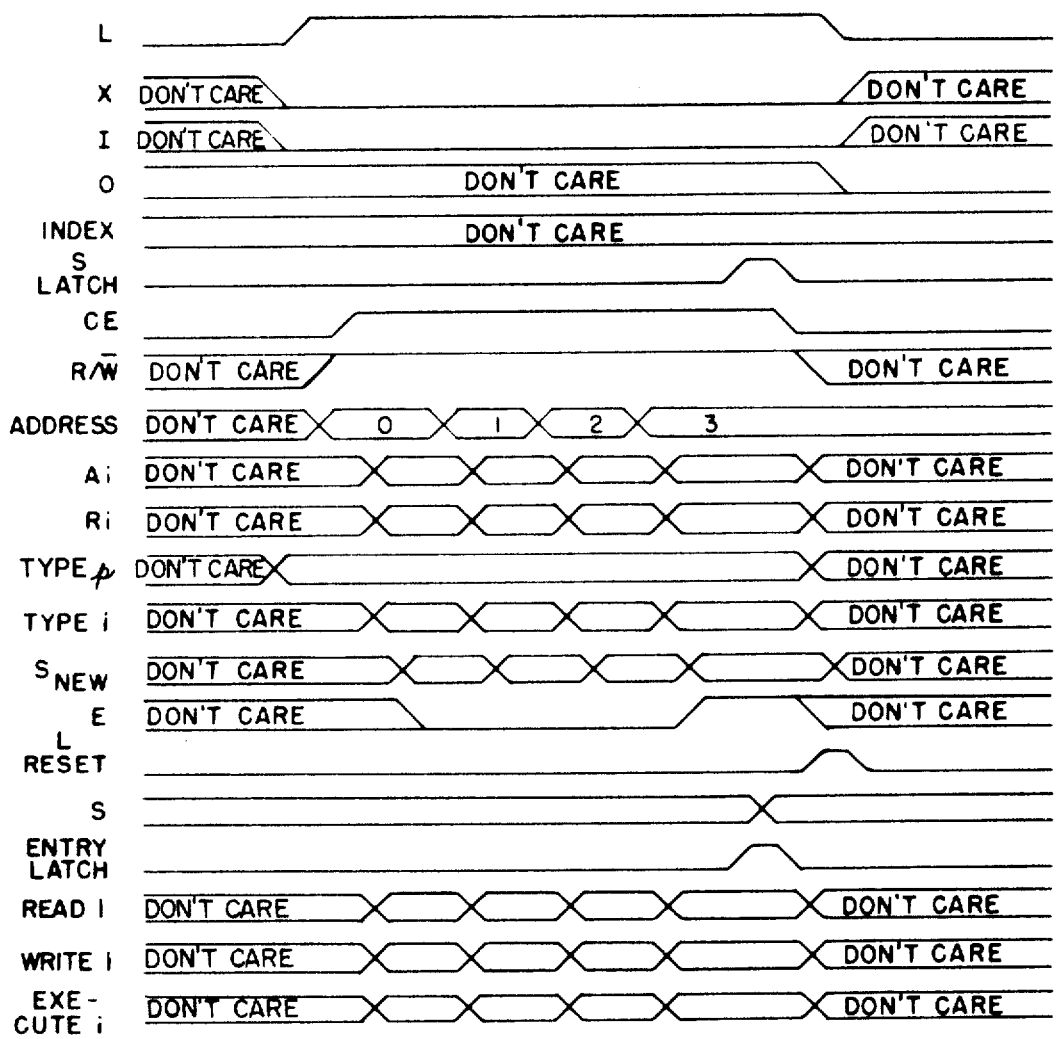
FIGS. 11 and 12 are timing diagrams illustrating entry transitions in accordance with the invention.
Figure 12:
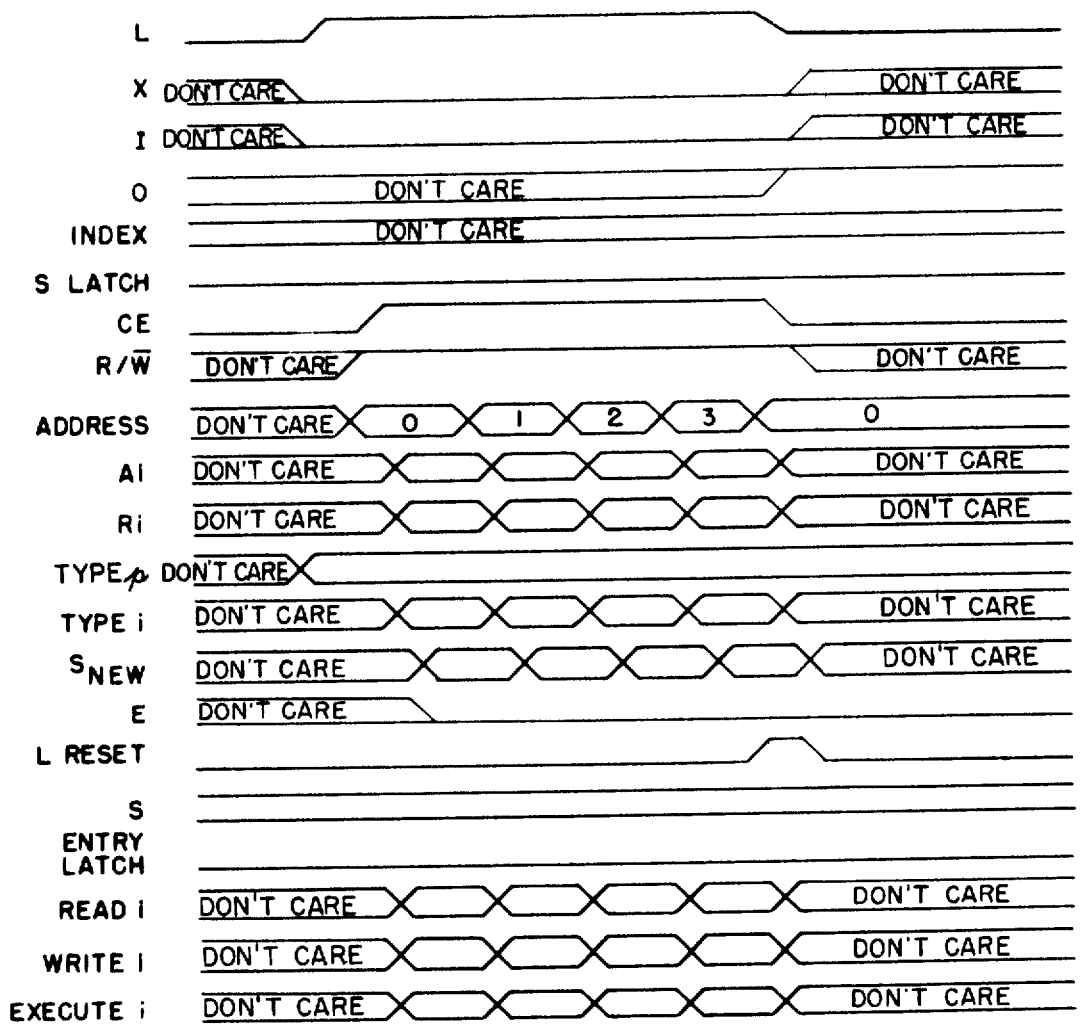

FIG. 11 represents the timing diagram of the control and data signals in the System Controller during an entry transition resulting in an eligible subsystem being detected which is associated with the address row three of the data constructs. It is assumed for the purpose of illustration that each memory array of the data constructs contains only four rows. FIG. 12 represents a similar timing diagram for an entry transition where no subsystem is detected as eligible.

During an exit transition, the synchronization and control logic circuit 14 accesses one row (i.e., one element from each of the eight memory modules) in the data constructs section 16. The value stored in the INDEX register is used as the address to select the appropriate row. As each element is output on its associated data bus, the system status updated logic circuit 20 generates the S$_{NEW}$ vector from the current S vector, the T, F and A vectors associated with row indexed, and the V vector returned by the processor in the V register of the interface 12. The synchronization and control logic circuit 14 causes the S register to latch the S$_{NEW}$ vector and returns access authorization to the processor by resetting the L discrete in the STATUS register. FIG. 13 represents the timing diagram of the control and data signals in the System Controller during an exit transition.

During a load transition the synchronization and control logic circuit 14 first causes the content of each of the interface data registers, R, A, T, F, EXECUTE, READ, WRITE, V, and TYPE$_i$ to be transferred to the associated data buses. Next, a row (i.e., one element from each of the eight memory modules) in the data constructs section 16 is accessed in a write mode. The value stored in the INDEX register of interface 12 is used to select the row accessed. This causes the content of each data bus to be written into the addressed element of the associated memory module. The synchronization and control logic circuit 14 latches the $S_{NEW}$ vector which is input from the interface 12 V register and returns access authorization to the processor by resetting the L discrete in the STATUS register. FIG. 14 represents the timing diagram of the control and data signals in the System Controller during a load transition.

MODULAR CONSTRUCTION OF SYSTEM CONTROLLER

In the following description of the invention, several modular construction approaches are set forth which take advantage of standardized components in various cascaded configurations to increase overall System Controller capacity. These are in addition to (and in support of) the modular increases in processing power available in transition machines by adding individual processors and memories. The embodiments described below can be implemented individually or in combination to obtain designated performance characteristics.

Modular Disjoint Expansion

Figure 15:
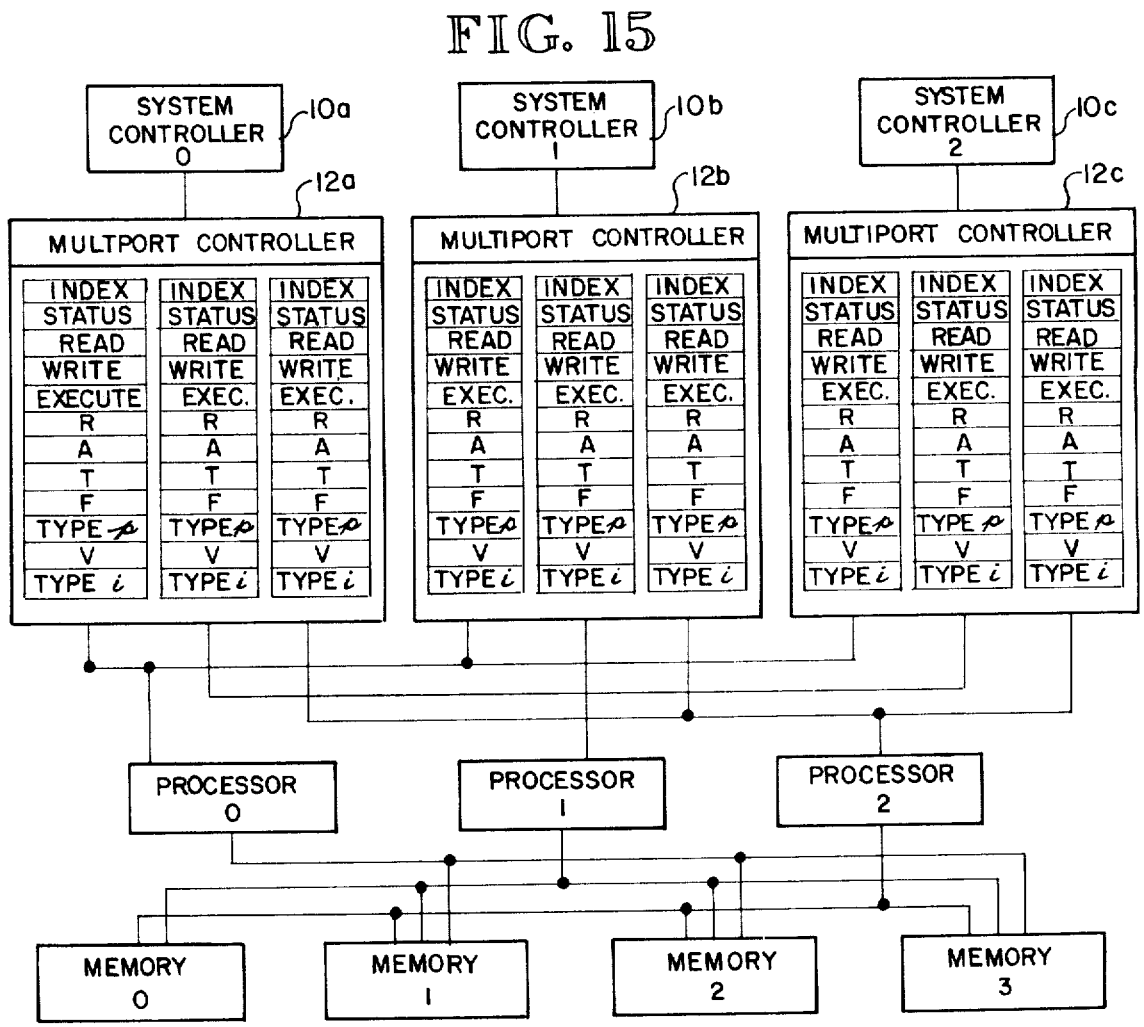
FIG. 15 is a block diagram of a first embodiment of a modular system controller in accordance with the invention.

In one embodiment of the invention a modular disjoint expansion of the System Controller may be utilized. Effectively, a plurality of System Controllers 10a, 10b, 10c may be utilized each with its associated multiport controller interface 12a, 12b, 12c as shown in FIG. 15. The configuration is particularly appropriate for batch processing wherein many disjoint computations may be running contemporaneously across all processors. If a processor is locked out of one System Controller, e.g., 10a, it may still be provided access to a subsystem through another System Controller, e.g. 10b. Each of the System Controllers 10a, 10b, 10c etc. is configured as shown in FIG. 3 and operates to enable subsystems specified within its data construct section independently of the other System Controllers. Each data construct section within the System Controllers 10a, 10b, 10c etc. is configured as shown in FIG. 4 having its own separate READ, EXECUTE, WRITE, TYPE, A, T, F and R registers independent of the comparable registers in other data construct sections of other System Controllers. The complete disjoint configuration of the transition machine of FIG. 15 effectively prevents interprocessor access contention over the System Controllers. Any convenient number of disjoint System Controllers and corresponding interface registers may be utilized depending upon the size of the processing required.

Figure 16:
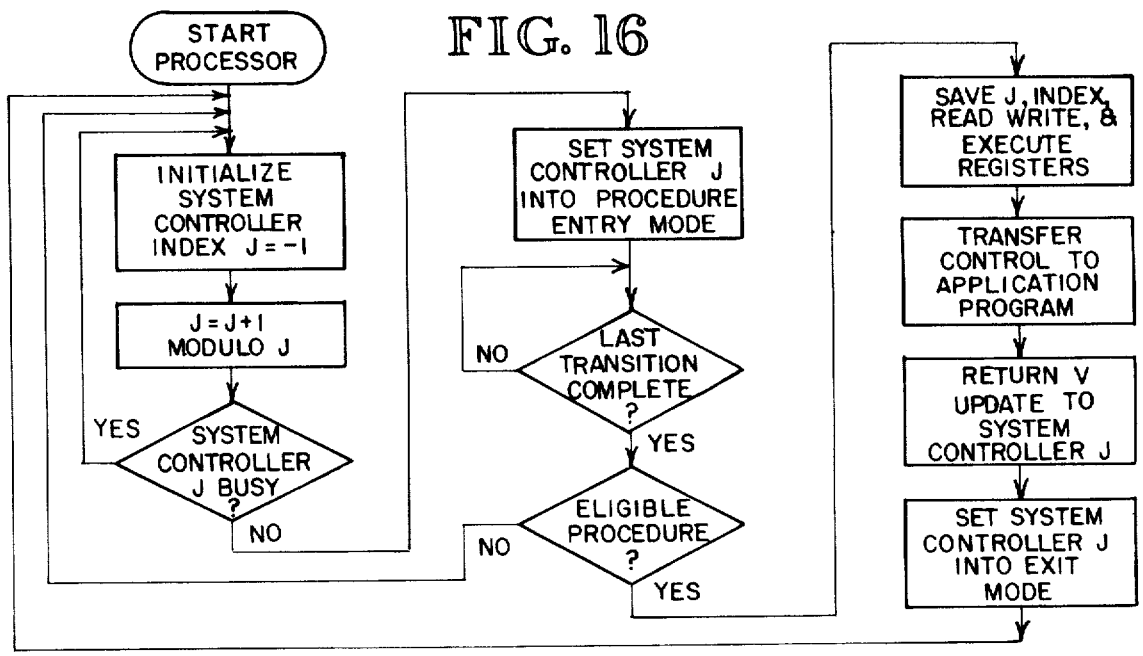
FIG. 16 is a flow diagram illustrating the entry/exit operations for the processor logic applicable for the embodiment of FIG. 15.

The disjoint configuration requires a slight modification to the standard processor/system controller interface procedure. Specifically, a means of indicating the specific System Controller that contains the data constructs for each active subsystem must be provided. This is required to ensure that when the subsystem exits, the exit transition is performed by only the System Controller that dispatched the subsystem originally. These are numerous methods to incorporate this capability. For example, with the configuration shown in FIG. 15, the processor can maintain an indicator of the specific System Controller which contains the data constructs for the procedure currently being executed. This is facilitated by the fact each set of system controller interface registers are uniquely addressable. The operational flow diagram of the processor interface procedure for this configuration is shown in FIG. 15a. This approach requires only a very minor modification to the standard processor/system controller interface logic 12 as shown in FIG. 16.

Modular Conjoined Expansion

An additional method of expanding the capability of the System Controller in accordance with the teachings of the invention is to expand the effective size of the data constructs section either horizontally or vertically. A horizontal expansion of the data construct capacity enables more data conditions to be utilized, and a vertical expansion of the data construct capacity enables a greater number of subsystems to be included within the system, effectively increasing the number of programming steps possible in solving the algorithm. In both the horizontal and vertical expansion embodiments, modularity is achieved using a plurality of fixed word-length conventional memory sections 16, procedure eligibility determination logic circuits 18, system status update logic circuits 20 and a single synchronization and control logic circuit 14.

In order to reduce the amount of logic required to implement the conjoined horizontal expansion of the System Controller, the data constructs section 16 and procedure eligibility determination logic circuits 18 of the standard System Controller have been broken down into more basic components, as shown in FIGS. 17 and 18 respectively. The data constructs section 16 comprises a memory component 1000 in which any one of the various data constructs R, A, T, F, TYPE$_i$, READ, WRITE and EXECUTE can be stored and a separate register component 1002 in which the S vector can be stored.

The procedure eligiblity determination logic circuit 18 is seen to comprise a type comparison component 1004 and a dot product component 1006. The type comparison component compares the two type indicator inputs (TYPE$_i$ and TYPE$_p$) for logical equivalence, generating one component of the procedure eligiblity indicator. The dot product component 1006 generates another component of the procedure eligibility indicator based on the system status vector (S) and the requirements vector (R$_i$) which are input thereto.

Horizontally Expanded System Controller

Figure 9A:
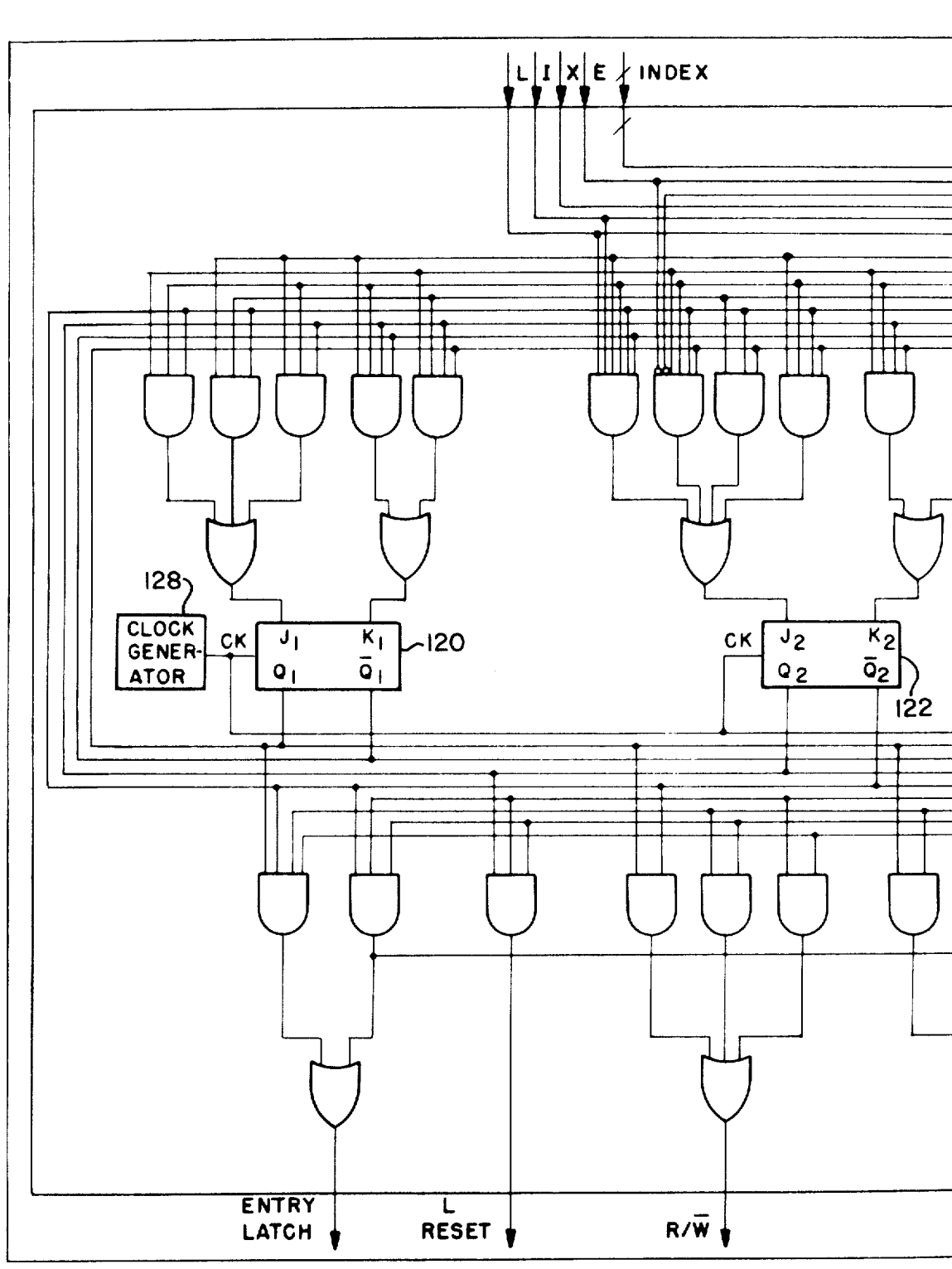
FIGS. 9A and 9B together form a detailed schematic diagram of the synchronization and control logic circuit of FIG. 8.
Figure 9B:
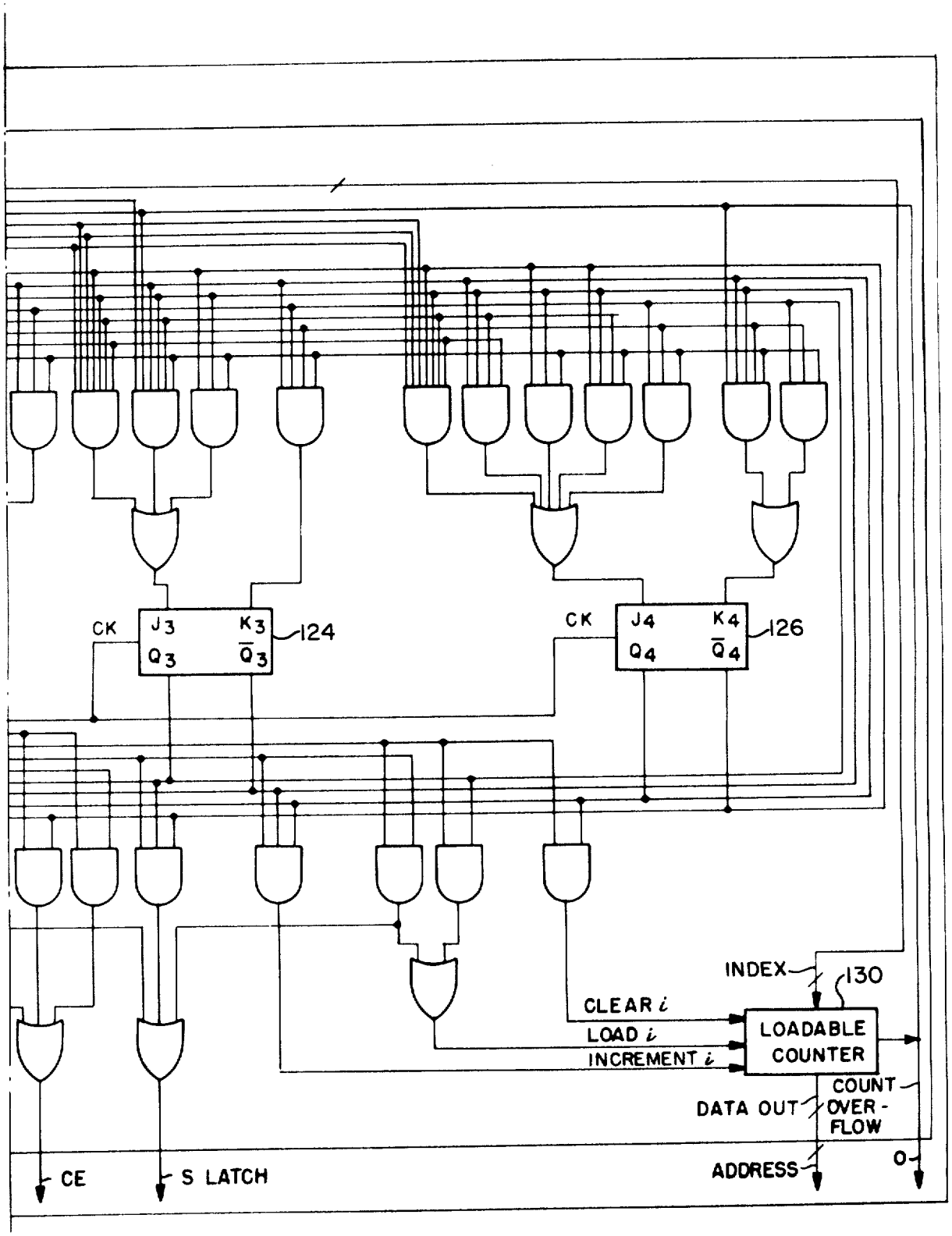
Figure 19A:
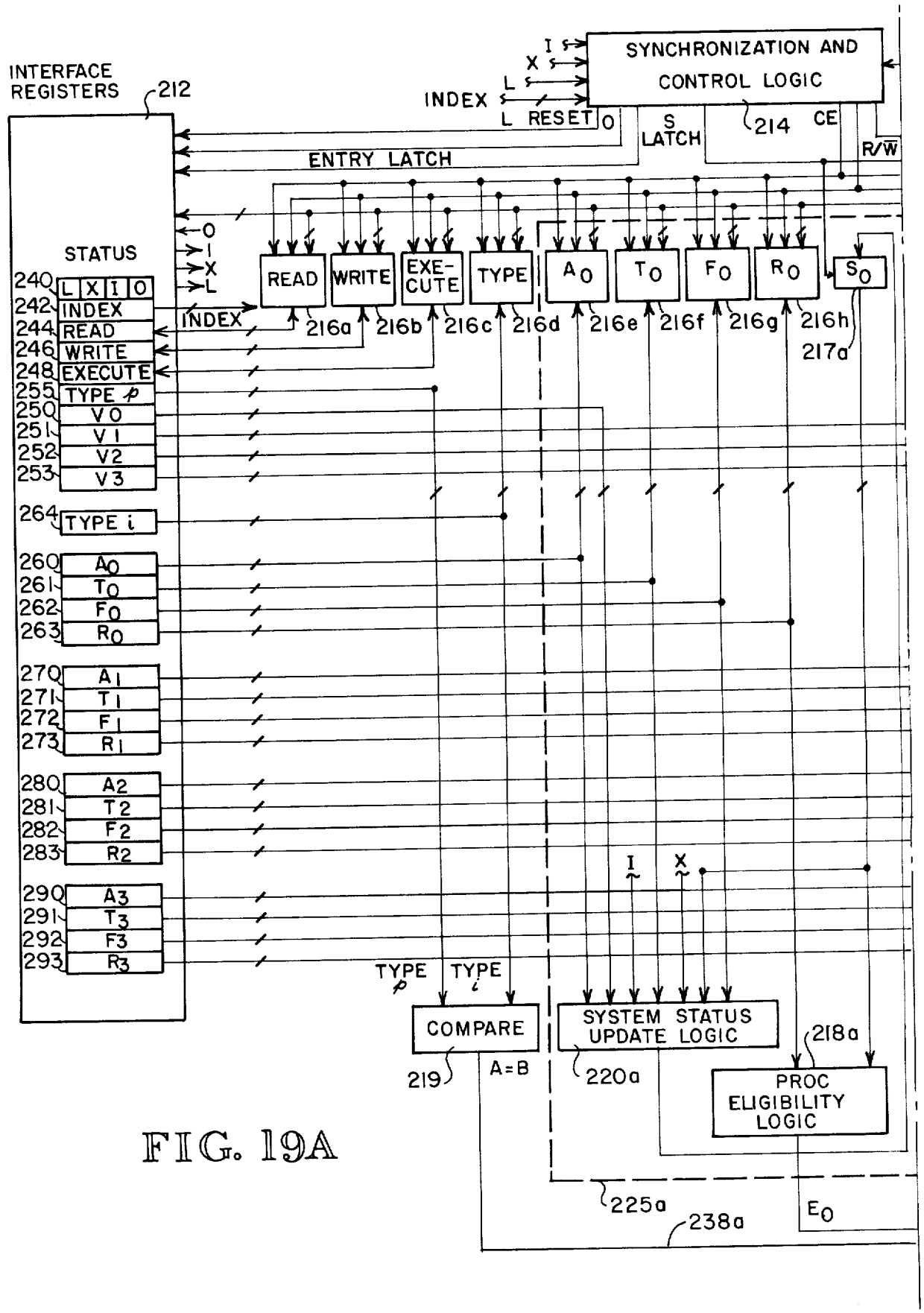
FIGS. 19A, 19B, and 19C together form a schematic diagram of a second embodiment of a modular system controller in accordance with the principles of the invention.
Figure 19B:
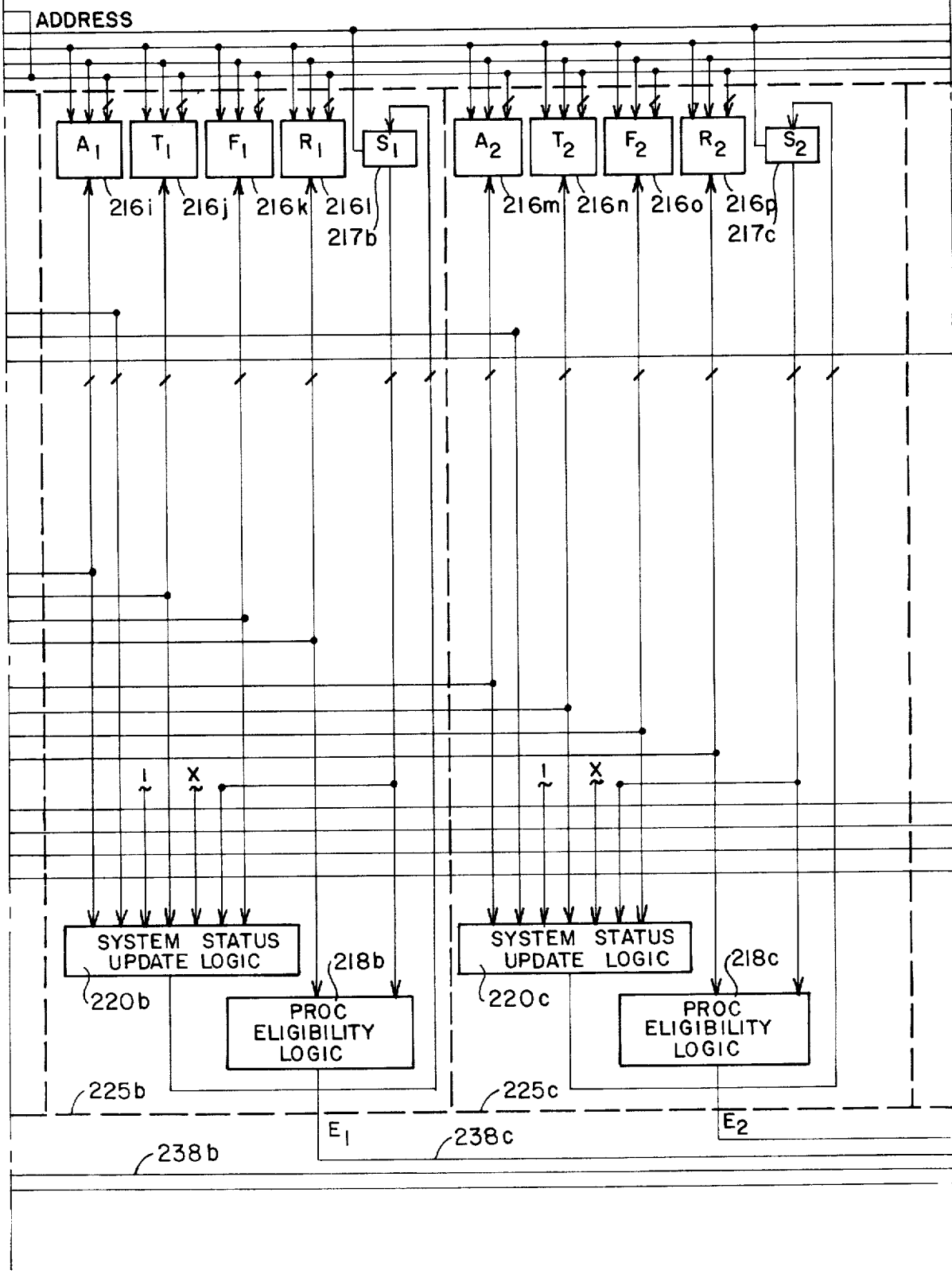
Figure 19C:
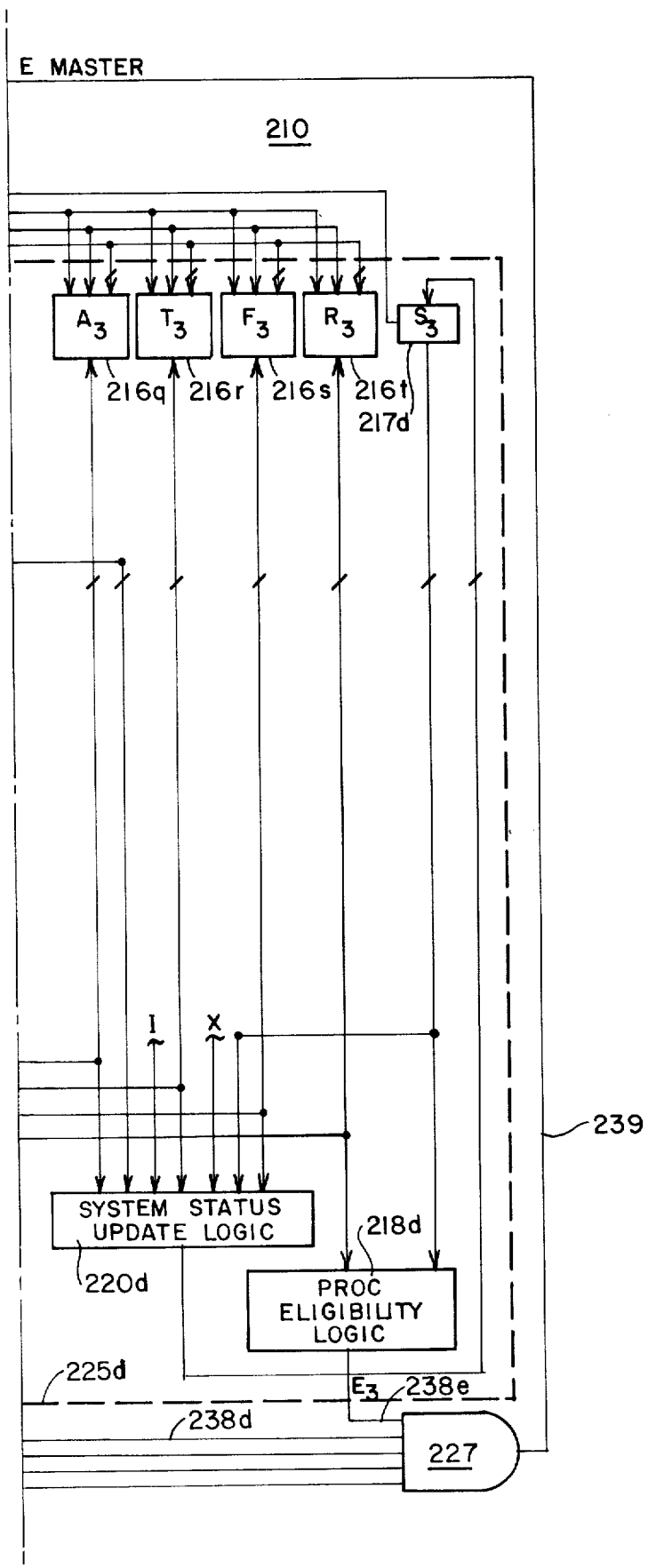

A horizontally expandable System Controller 210 and modified interface 212 is illustrated in FIGS. 19A, 19B, and 19C. The System Controller 210 is seen to comprise a synchronization and control logic circuit 214, a plurality of data constructs memory components 216a–216t (where at least the memories within each modulor unit, such as 216e–216b will have compatible characteristics such as word-width), a plurality of data constructs register components 217a, 217b, 217c, and 217d, a procedure eligibility determination logic type comparison component 219, a plurality of procedure eligibility determination logic dot product components 218a, 218b, 218c, and 218d, and a plurality of status update logic circuits 220a, 220b, 220c and 220d. The synchronization and control logic circuit 214 is configured as shown in FIGS. 9A and 9B; each of the data construct memory components 216 and 217 is configured as shown in FIG. 17; each procedure eligibility determination logic circuit component 218 and 219 is configured as shown in FIG. 18; and each system status update logic circuit 220 is configured as shown in FIG. 7.

Figure 20A:
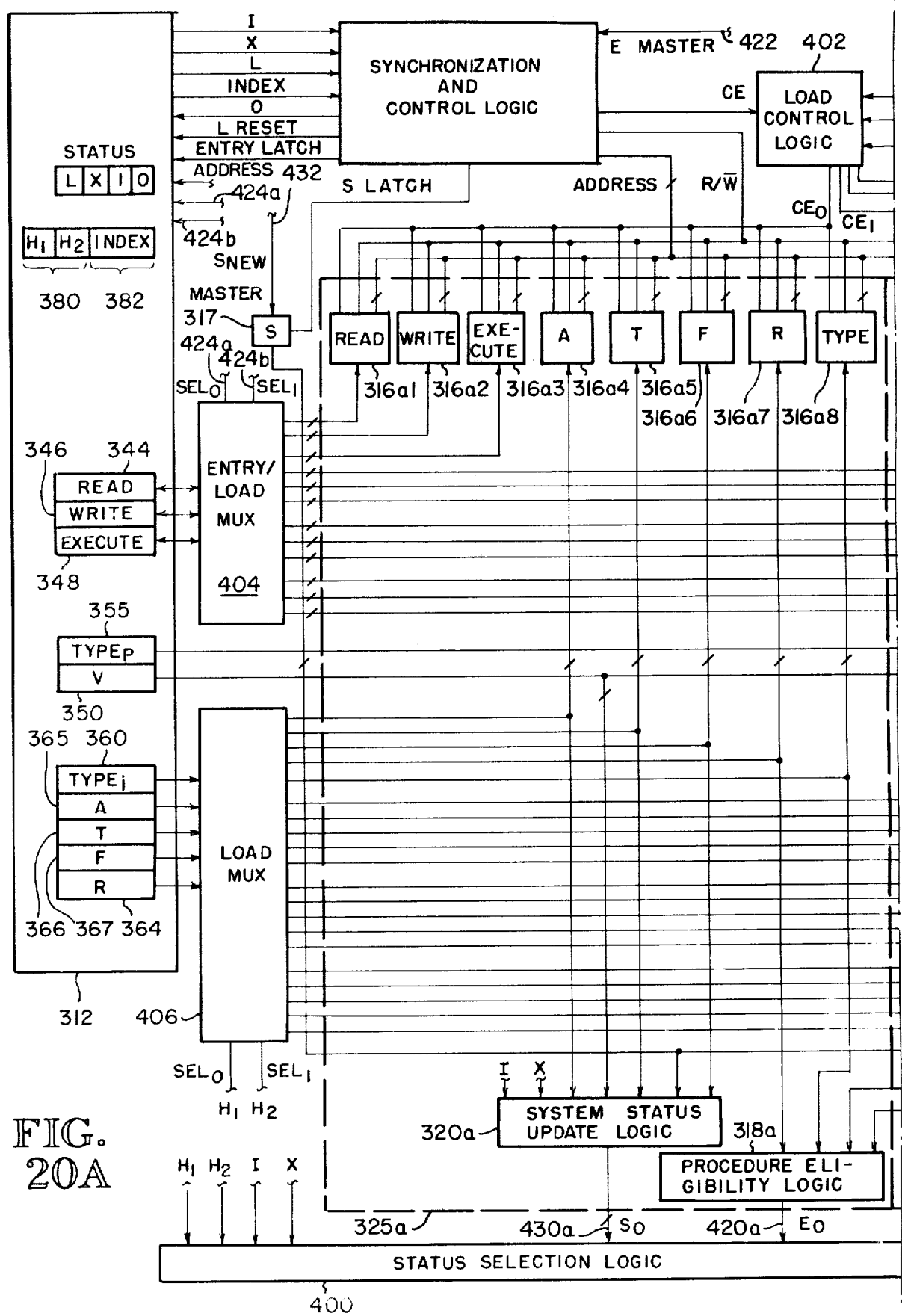
FIGS. 20A, 20B, and 20C taken together form a schematic diagram of a third embodiment of the invention.

Data construct section components 216e, 216f, 216g, 216h, and 217a, procedure eligibility determination logic circuit 218a and the system status update logic circuit 220a form a modular unit 225a as shown by the dotted line in FIG. 20A. A second modular unit 225b is formed by the data construct section componetns 216i, 216j, 216k, 216l, and 217b, procedure eligibiity determination logic circuit 218b and the system status update logic circuit 220b. Additional modular units 225c and 225d are made up from their elements 216m, 216n, 216o, 216p, 217c, 218c, 220c, and elements 216q, 216r, 216s, 216t, 217d, 218d, and 220d, respectively. In accordance with the principles of the invention any number of modular units 225 may be employed as will become clear with respect to the operation of the circuit of FIG. 19.

Inasmuch as each of the modular units 225a-225d is identical, the following description is applicable to any one unit, and consequently, no suffix is utilized unless a particular unit is intended. Within each modular unit 225, the data construct section components 216 and 217, procedure eligibility determination logic circuit component 218 and status update logic circuit 220 are interconnected with one another in a similar fashion to that shown in FIG. 3. The primary difference between the interconnection of the elements between FIG. 3 and FIG. 19 is the utilization of a multiple input AND gate 227. The inputs of AND gate 227 are connected to receive the outputs of the procedure eligibilty determination logic circuit components 218 and 219 along the lines 238a-238e. The output of AND gate 227 is fed along a line 239 to the input of a synchronization and control logic circuit 214. This input signal to the synchronization and control logic circuit 214 functions the same as the input E signal to synchronization and control logic circuit 14 of FIG. 3. ANDing all of the outputs of the procedure eligibility determination logic circuit components 218 and 219 of the individual modular units is required inasmuch as each modular unit operates with only a part of the system status vector (a component group of data conditions), and eligibility of a particular subsystem is only appropriate if each of the partial dot products of the system status vector S and the relevance matrix R indicates a true eligibility. Additionally, the type of processor making the request must be equivalent to the processor type requirement for the indexed subsystem. As a consequence, a given subsystem is eligible if an only if all of the outputs of the procedure eligibility determination logic circuit components 218a-218d and the type comparison component 219 are ANDed together.

In effect, the R, T, F and A matrices as well as the S vector are partitioned by the modular unit arrangement into multiple groups of columns modulo M. M is the number of columns available in a modular unit 225, i.e. the number of columns in each of the R, T, F, and A matrices and the S and V vectors within the data construct section components 216 and 217 and is determined by the word-width of the memories that are selected for the particular implementation.

The interface 212 is configured similar to the interface of FIG. 3 but has been expanded to accommodate the modifications as required by the horizontal expansion of the System Controller. The interface 212 is seen to comprise a STATUS register 240 and an INDEX register 242 utilized in all entry, exit and load transitions and a READ register 244, WRITE register 246 and EXECUTE register 248 utilized during entry and load transitions. All these registers are used in a similar fashion as described in relation to FIG. 3. Additional registers are also utilized such as V registers 250-253 (exit and load transition) and the $TYPE_p$ register 255 (entry transition). The V register is composed of four separate registers, one for each of the four modular units 225 as illustrated. The V vector is effectivley broken down into components modulo M. Components $V_0$, $V_1$, $V_2$, and $V_3$ are stored respectively in registers 250, 251, 252, and 253. Each component is fed to a separate one of the modular units 225.

Numerous registers of the interface 212 are utilized only during the load transition. These registers comprise the A, T, F, R, and TYPE; registers of FIG. 3. For the horizontally expanded System Controller of FIG. 19, however, the first four of these registers are likewise broken down modulo M so that again one component of each of these data constructs is fed to each of the modular units 225. For example, the A construct is broken up into components $A_0$, $A_1$, $A_2$ and $A_3$. Each component is fed to a separate one of the modular units 225. Likewise, the constructs T, F and R are also broken up in a similar fashion. These load registers of the processor/system controller interface must thus be expanded in accordance with the number of modular units 225 utilized in forming the entire System Controller. As shown in FIG. 19, register 260 stores component $A_0$, register 261 stores component $T_0$, register 262 stores component $F_0$ and register 263 stores component $R_0$. A single $TYPE_i$ register 264 is connected to the data constructs section memory component 216d that is dedicated for storing the processor type requirements for each subsystem. The $TYPE_i$ register 264 is to be distinguished from the entry $TYPE_p$ register 255. As an alternate embodiment, however, a multiplexing arrangement may be utilized where a single interface register would be employed for the run time (entry transition) and load operations. The multiplexing unit would be responsive to the I bit of the status register 240 for example to switch data within the single TYPE register as appropriate for entry or load operations. The numerous other components of the A, T, F and R matrices are shown in FIG. 19 and identified by numerals 270-273 for the second component, 280-283 for the third component and 290-293 for the fourth component. The number of components naturally corresponds to the number of modular units 225. These register sets have been drawn together in the interface 212 to simplify the description of the modular units 225 in the System Controller. However, each of these registers, for example the A registers, may be contiguous as is the V register (contiguous register 250-253 storing components $V_0$, $V_1$, $V_2$ and $V_3$).

In operation, when a procedure entry transition is initiated, all of the component groups are enabled simultaneously by the common synchronization and control logic circuit 214. The component groups of the modular units 225 generate component procedure eligibility indicators $E_0$, $E_1$, $E_2$ and $E_3$ based on the four groups of M data conditions maintained by the entire System Controller. The type comparison component 219 also generates a component, designated $E_t$, of the procedure eligibility indicator. For a given subsystem to become eligible for execution it must be found eligible in all component groups. Consequently, each component of the eligibility indicator E is connected to AND gate 227 and fed to the synchronization and control logic circuit 214 along the line 239. The synchronization and control logic circuit 214 operates as in FIGS. 9A and 9B to control the output of the data construct section 216. The procedure entry transition continues until an eligible procedure is detected, or it is detected that no procedures are currently eligible. Assuming a subsystem is found eligible, the interface 212 is loaded with the appropriate values of the READ register 216a, WRITE register 216b, and EXECUTE register 216c, the updated S vector is generated and latched in each of the component groups of the modular units 225, and the L busy discrete in the STATUS register 240 is reset.

When a procedure exit transition is initiated, all of the modular units 225 are enabled simultaneously and perform the appropriate system status update to the M data conditions maintained in each modular unit 225 in a parallel fashion. The L busy discrete of the status register 240 is then reset, completing the procedure exit transition.

The V vector returned by any individual processor to the interface 212 may be transferred sequentially into the registers 250–253 by the processor during an exit transition. The complete V vector, $V_0$, $V_1$, $V_2$ and $V_3$ is then fed in parallel to the modular units 225.

When a load transition is initiated, the data from the load registers, namely registers 260–263, 270–273, 280–283 and 290–293 are transferred simultaneously to the appropriate data construct section 216 of the modular units 225. The TYPE$_i$ register 264 is loaded simultaneously into the TYPE data construct section 216d. Data from the registers 244, 246, 248, 250–253 are also transferred simultaneously to the appropriate data constructs sections 216 of the modular units 255. The registers 250–253 are used to load the status vector S whose components $S_0$, $S_1$, $S_2$ and $S_3$ are stored in registers 217a–217d. This loading is achieved via the logic circuit of FIG. 7. When the data transfer is complete, the L bit of the STATUS register 240 is reset.

For the horizontally expanded System Controller as illustrated in FIG. 19, the worst case transition time depends only upon the number of rows (N) in the modular unit 225. Effectively, the time required to perform an entry, exit or load transition remains constant and is independent of the horizontal size of the System Controller once the interface registers have been loaded.

Vertically Expanded System Controller

Figure 20B:
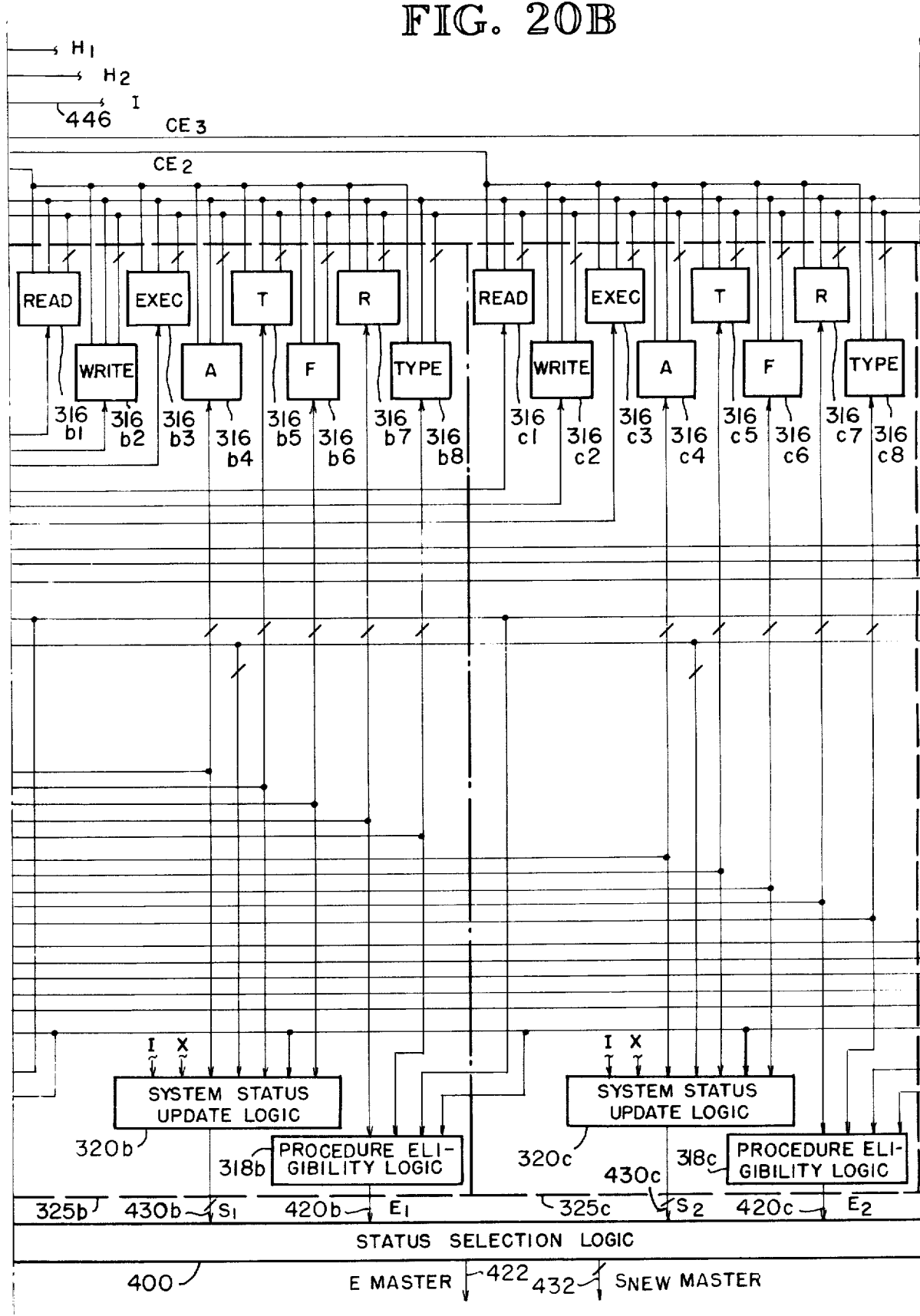
Figure 20C:
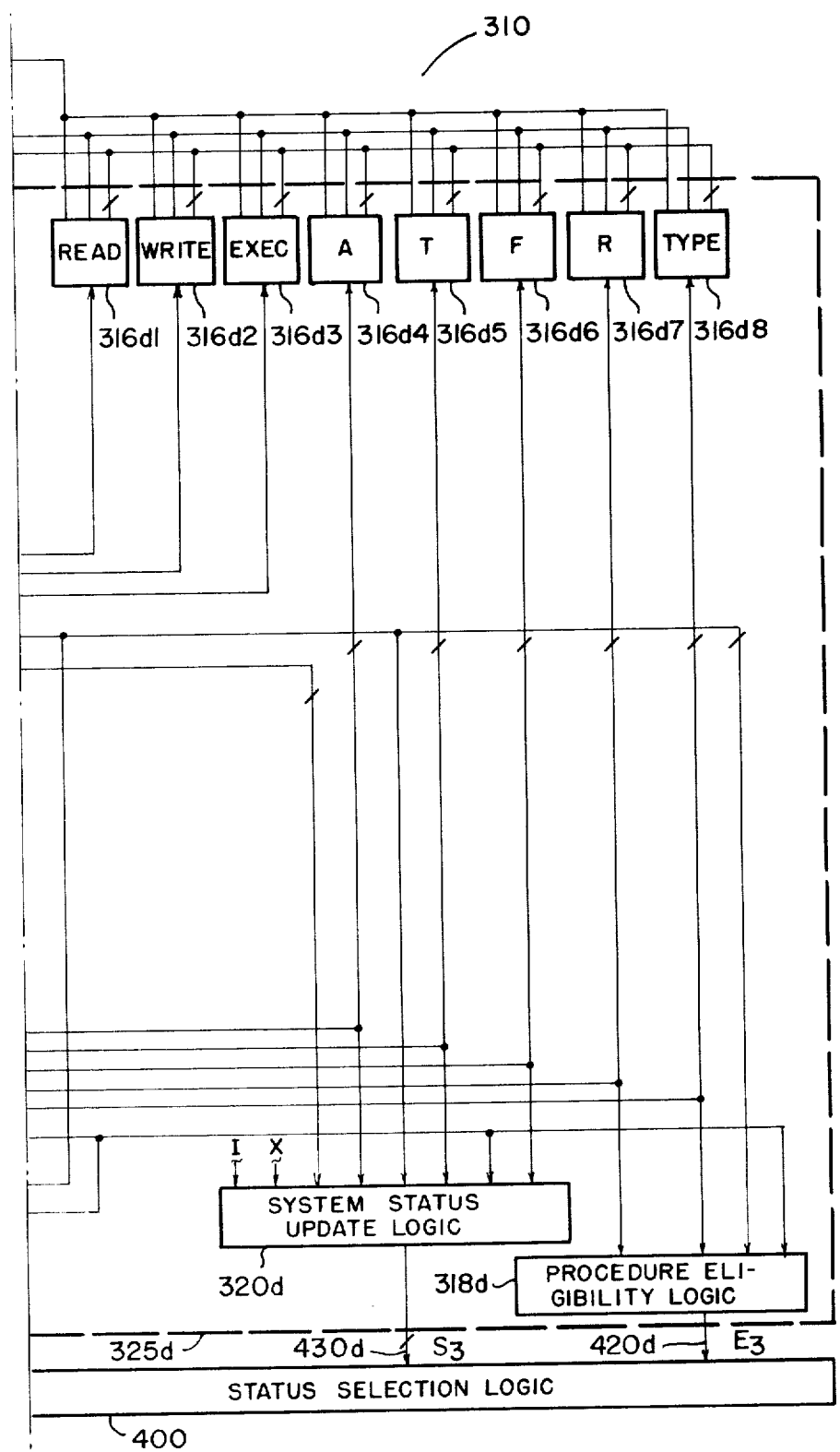

FIGS. 20–22 illustrate a vertically expanded embodiment of a System Controller 310 and associated interface 312. As in the horizontally expandable System Controller, the vertically expanded System Controller comprises a plurality of modular units 325 designated as 325a, 325b, 325c and 325d. Each modular unit 325 comprises a plurality of data construct memory components 316, a procedure eligibility determination logic 318 and a system status update logic circuit 320. A single synchronization and control logic circuit 314 and a single data constructs register component 317 are employed and are interconnected to the modular units 325 as shown. The four circuits 314, 316, 317 and 320 are the same as their counterpart circuits 214, 216, 217 and 220 previously described in relation to FIG. 19. Circuit 318 is the same as its counterpart circuit 18 shown in FIG. 6.

In the vertically expanded System Controller 310, the matrices A, T, F and R as well as the TYP$_i$, READ, WRITE and EXECUTE arrays are partitioned into multiple groups of rows modulo N. N is the number of rows supported by the standardized component or the modular unit 325. Each of these groups of data constructs is loaded into a separate group data construct memory components 316a1 ... 316a8, 316b1 ... 316b8, 316c1 ... 316c8, and 316d1 ... 316d8 through the processor interface registers 312. A single system status vector S is maintained in the data constructs section register component 317 on which each modular unit 325 operates.

The interface 312 is seen to comprise a STATUS register 340, INDEX register 342, and a plurality of registers identified as READ register 344, WRITE register 346, EXECUTE register 348, V register 350 and TYPE$_p$ register 355. The interface 312 also comprises a plurality of registers used only during the load transition. These registers comprise TYPE$_i$ register 360, R register 364, A register 365, T register 366 and F register 367. The prime difference between the interface 312 and the previously described interface 212 of FIG. 19 or interface 12 of FIG. 3 is the utilization of a two-field INDEX register 342. The first field of the INDEX register is a group selection field 380, and the second field of the INDEX register 342 is a displacement field 382. The group selection field 380 designates which component group, namely which modular unit 325 contains the row in question (the subsystem being indexed). The displacement field 382 designates which row within the selected modular unit 325 actually contains the desired information. The group selection field 380 is embodied herein by a two-bit field designation $H_1$ and $H_2$. Additional logic circuitry is described for selecting the particular modular unit 325 designated by the bits $H_1$ and $H_2$ and to multiplex data and control signals appropriately to and from the selected modular unit. In general there will be $\lceil \log_2 N \rceil$ bits allocated to the group selection function. (The nomenclature $\lceil y \rceil$ indicates the first integer value greater than or equal to y.)

In order to achieve appropriate routing of the data and control signals, the System Controller of FIG. 20 further comprises a status selection logic circuit 400, a load control logic circuit 402, an entry/load bidirectional multiplexer 404 and a load multiplexer 406. The status selection logic circuit 400 is shown in detail in FIG. 21, and the load control logic circuit 402 is shown in detail in FIG. 22.

As shown in FIG. 21, the status selection logic circuit 400 is seen to comprise a priority encoder 410, OR gate 412, a two-to-one multiplexer 414, a NOR gate 416 and a status multiplexer 418. The priority encoder 410 has input lines 420a–420d connected to receive the outputs $E_0$, $E_1$, $E_2$, $E_3$ of the corresponding procedure eligibility determination logic circuits 318a–318d. Lines 420a–420d are also connected to the inputs of the multiple input OR gate 412 which provides a single output $E_{master}$ along a line 422. Line 422 is in turn interconnected as an input to the synchronization and control logic circuit 314 of FIG. 20A.

The output of the priority encoder 410 depends upon the particular values along its input lines 420a-420d. The truth table for the priority encoder 410 is shown in the following Table III.

TABLE III

| INPUT LINES 420 | | | | OUTPUTS | |
|---|---|---|---|---|---|
| 420d | 420c | 420b | 420a | 424a | 242b |
| 0 | 0 | 0 | 0 | 0 | 0 |
| X | X | X | 1 | 0 | 0 |
| X | X | 1 | 0 | 0 | 1 |
| X | 1 | 0 | 0 | 1 | 0 |
| 1 | 0 | 0 | 0 | 1 | 1 |

Legend:
X = don't care
1 = true
0 = false

The binary output of the priority encoder 410 effectively establishes a coded priority sequence such that assuming simultaneous eligibility of subsystems within each modular unit 325, priority is assigned to the first unit, namely modular unit 325a. Absent an eligible subsystem within modular unit 325a the next priority is given to modular unit 325b etc. The output of the priority encoder is connected via lines 424a and 424b to multiplexer 414 (FIG. 21) as well as entry/load bidirectional multiplexer 404 (FIG. 20). The binary coded output from the priority encoder which feeds the multiplexer 404 effectively routes the address designation values of interest to the READ register 344, WRITE register 346 and EXECUTE register 348 from the appropriate one of the modular units 325.

Further inputs to the multiplexer 414 (FIG. 21) are provided by the multiple input NOR gate 416 along a select line 426. The two inputs to the NOR gate 416 are provided by the I and X bits from the STATUS register 340. The output of NOR gate 416 is high during an entry transition and low during either an exit or load transition. The four data inputs to the multiplexer 414 are provided by the most significant bits of the INDEX register 342, namely, the $H_1$ and $H_2$ bits of the group selection field 380 and the coded output of the priority encoder 410. (In general there will be $\lceil log_2N \rceil$ outputs from the priority encoder and $\lceil log_2N \rceil$ bits $H_1$, $H_2$, ... $H_{\lceil log_2N \rceil}$.) An entry transition provides a high output along the select line 426 effectively passing the signals along the input lines 424a and 424b to the output of the multiplexer 414 along lines 428a and 428b. During an exit or load transition, the low output signal along the select line 426 effectively feeds the group selection field $H_1$, $H_2$ from the input of the multiplexer 414 to its output along the output lines 428a and 428b. In turn, lines 428a and 428b are interconnected to the status multiplexer 418. Status multiplexer 418 has a plurality of input data bus lines 430a-430d and a single output data bus line 432. The select inputs along lines 428a and 428b determine which of the input lines 430a-430d is fed to the output line 432. The truth table for designating operation of the multiplexer 418 is shown below in Table IV.

TABLE IV

| INPUTS | | OUTPUT |
|---|---|---|
| 428a | 428b | 432 |
| 0 | 0 | 430a |
| 0 | 1 | 430b |
| 1 | 0 | 430c |
| 1 | 1 | 430d |

The input lines 430a-430d of the multiplexer 418 are fed from the corresponding outputs of the modular units 325a-325d. In particular, input lines 430a-430d are fed from the outputs of the system status update logic circuits 320a-320d providing updated system status output signals $S_0$, $S_1$, $S_2$ and $S_3$ respectively. The output of the multiplexer 418 is fed as a $S_{new\ master}$ signal along line 432 (FIG. 20) as an input signal to the data construct register component 317.

A circuit diagram of the load control logic circuit 402 is shown in FIG. 22. The load control logic circuit 402 is seen to comprise a binary decoder 440 and a load multiplexer 442. The input to the binary decoder 440 is taken from the high order bits of the INDEX register, mainly the group selection field 380. These bits $H_1$ and $H_2$ are the same as those utilized in the multiplexer 414 of FIG. 21. The binary decoder 440 provides output signals along the four lines 444a-444d which are fed to the inputs of the load multiplexer 442. The operation of the binary decoder 440 is defined by Table V below.

TABLE V

| INPUTS | | OUTPUTS | | | |
|---|---|---|---|---|---|
| $H_1$ | $H_2$ | 444a | 444b | 444c | 444d |
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

The load multiplexer 442 effectively selects between two groups of input lines, each group having four lines therein as determined by the input along a select line 446. Select line 446 is fed from the I bit of the STATUS register 340 (FIG. 20A). During a load transition I=1 and the output of the binary decoder 440 is effectively passed to the output of the load multiplexer 442 along its output lines 448a-448d. When I=0, namely during an entry or exit transition, the CE signal from the synchronization and control logic circuit 314 is fed identically to each of the output lines 448a-448d of the load multiplexer 442.

The operation of the circuits illustrated in FIGS. 20-22 may be understood in reference to a description of the entry, exit and load transitions. When an entry transition is initiated, all of the component groups, namely, the modular units 325 are enabled simultaneously by the common synchronization and control logic circuit 314. The modular units 324 generate procedure eligibility indicators $E_0$-$E_3$ in parallel for the particular row indexed by the synchronization and control logic circuit 314. The system status update logic circuits 320a-320d of the modular units 325 generate the updated system status signals $S_0$-$S_3$ in parallel for the particular row indexed. In the representative example of four modular units 325 there will be, in effect, four separate eligibility indicators $E_0$-$E_3$ and four updated system status vectors $S_0$-$S_3$ generated in parallel. If any of the eligibility indicators correspond to a subsystem eligible condition (E=1), the synchronization and control logic circuit 314 causes the $S_{new}$ vector for the modular unit 325 containing the eligible subsystem to be latched into the common S register of the data constructs register component 317. The selection of which of the vectors $S_0$-$S_3$ will in fact be passed on as the new system status vector (termed the system status master vector, $S_{new\ master}$) is determined by the priority encoder 410 as per truth Table III. Thus, although all of the system status update logic circuits 320a-320d may in fact compute their own S vector, only one of these vectors will be passed on and become the new system status vector depending upon the output of the priority encoder 410. During the entry transition, multiplexer 414 selects the input lines 424a and 424b (since the output of NOR gate 416 is high) and passes signals generated thereon to its output along lines 428a and 428b. These output lines are, in effect, the select lines for the status multiplexer 418 and are utilized to select one of the status vectors $S_0$, $S_1$, $S_2$ and $S_3$. The synchronization and control logic circuit 314 also addresses each of the data construct memory components 316 for passing the appropriate data to the READ register 344, WRITE register 346 and EXECUTE register 348 of the interface 312. Appropriate multiplexing from the data construct sections 316a–316d into the interface READ, WRITE and EXECUTE registers is determined by the entry/load bidirectional multiplexer 404 utilizing again the output of the priority encoder 410. Thus, once a particular modular unit 325a–325d is selected during an entry transition, a status vector appropriate to that selected modular unit is latched into the S register and the READ, WRITE and EXECUTE addresses are passed from that selected unit to the READ, WRITE and EXECUTE registers of the interface 312. The displacement field of the INDEX register 342 is loaded with the row number of the eligible procedure (i.e. ADDRESS) and the group selection field 380 is loaded with the output of the priority encoder 410 (i.e., lines 424a and 424b) which indicates the component group 325 that contains the eligible procedure.

If no procedure is determined eligible during an entry transition, the 0 bit in the STATUS register 340 is set true, otherwise it is set false. The L bit is then set false to allow a subsequent access by processors to the interface 312 and System Controller 310.

When a procedure exit transition is initiated, all component groups, namely, all of the modular units 325 are enabled simultaneously and generate in parallel an updated system status vector, $S_0$–$S_3$, for the row specified by the displacement field 382 of the INDEX register 342. The status selection logic circuit 400 then selects the appropriate one of the updated status vectors which is to be stored in the data construct register component 317. The selection of the status vector for the $S_{new\ master}$ signal along line 432 is now made by means of the group selection field 380 which provides inputs to the multiplexer 414 (FIG. 17). In the exit transition mode the output of NOR gate 416 is low thereby selecting the $H_1$, $H_2$ bits forming the group selection field 380, and these bits in turn are utilized as the select inputs to the status multiplexer 418 thereby selecting one of the calculated outputs of the system status update logic circuits 320a–320d as the new system status vector. The selected calculated output of the system status update logic circuit 320 corresponds to the modular unit 325 being designated by the exiting processor. The L bit of the status interface register 340 is then reset to allow subsequent access by the data processors.

When a load transition is initiated, the data from the processor/System Controller interface register 312 is transferred to the particular modular unit 325 specified by the group selection field 380 of the INDEX register 342 and into the particular row of the data construct memory components 316 as specified by the displacement field 382 of the INDEX register 342. This selection is performed by the load control logic 402. The select line 446 of the load multiplexer 442 is controlled by the I bit of the STATUS register 340. When I is high (logical 1) the lines 444a–444d which feed the load multiplexer 442 are passed to the output lines 448a–448d. The code present on the input lines 444a–444d is generated by the binary decoder 440 in response to the code of the group selection field 380 as per Table V. The output of the load multiplexer 442 along the output lines 448a–448d control the CE terminals of the data construct section 416a–416d, respectively. As a consequence, the load control logic circuit 402 controls which of the data construct sections 416 will be enabled for loading data along its input lines.

The data to be loaded into the data construct memory components 316 is fed by means of the registers of the interface 312. These registers include the $TYPE_i$ register 360, READ register 344, WRITE register 346, EXECUTE register 348, R register 364, A register 365, T register 366 and F register 367. The inputs from these registers are multiplexed into the modular units 325 by means of the load multiplexer 406 and the entry/load bidirectional multiplexer 404. The load multiplexer has its select lines controlled by the group selection field 380 of the INDEX register 342. This establishes a data path from the interface registers 360, 364, 365, 366 and 367 to only the data constructs memory components 316a–316d that are to be loaded. The select lines of the entry/load multiplexer 404 are also set equal to the group selection field 380 of the INDEX register during load transitions, as described previously in relation to the status selection logic of FIG. 21. A data path is therefore, also established from the interface registers 344, 346 and 348 by the entry/load bidirectional multiplexer 404 to only the data constructs memory components 316a–316d that are to be loaded. As a consequence, only the appropriate data construct sections 316a–316d is enabled and loaded by the load registers of the interface 312. Once all of the data has been transferred, the L bit of the status interface register 340 is reset, completing the load transition. It is to be noted that during the load transition, the status selection logic circuit 400 permits the current value of the V interface register to be fed as an output $S_{new\ master}$ along line 432 therefore providing an input to the data construct section register component 317 for loading the initial system status vector.

In the vertically expanded System Controller 310, the worst case transition time depends only upon the number of rows N in the modular unit 325. Thus, the time required to perform an entry or exit transition remains constant independent of the total number of rows maintained by the System Controller.

While there has been described and illustrated specific embodiments of the invention, it will be clear that variations in the details of the embodiments specifically illustrated and described may be made without departing from the true spirit and scope of the invention as defined in the appended claims.

APPENDIX A

In the implementation of the model of parallel computation, specific definitions are assigned to the set of constructs R, S and E and the matrix algebraic operation, "·" on these constructs which effect a transition system.

Definition A.1. The system status vector, S is a set of binary status indications on the data set d such that for every data condition there is an associated status indications, $S_j$ in S if and only if $S_j$ is relevant to enabling some procedure in the system. $S_j=1$ if the associated data condition is met, $S_j=0$ otherwise.

Definition A.2. The system eligibility vector, E is a set of binary status indications on the set of unary predicates, $R_i$, indicating whether $R_i$ is currently satisfied, enabling the associated procedure. $E_i=1$ indicates the associated unary predicates are satisfied; $E_i=0$ otherwise.

Definition A.3. A system status condition, $S_j$ is relevant to enabling procedure i if and only if the data condition whose status is indicated by $S_j$ is included in the unary predicates, $R_i$.

Proposition A.1. The unary predicates, $R_i$ can be represented as a set of binary relevance indications associated (and in conjunction) with each of the conditions whose status is maintained in S. This proposition follows directly from the previous definitions.

Definition A.4. The relevance matrix, R is comprised of binary relevance indications, $r_{ij}$ indicating the relevance of system status condition j to enabling procedure i. Relevance is indicated by $r_{ij}=0$, irrelevance by $r_{ij}=1$.

Definition A.5. The logical dot product, P of a matrix M times a vector, V with compatible dimensions is defined as the vector, $P=M \cdot V$, where $$P_i = \bigwedge_{j=1}^{J} m_{ij} \vee V_j.$$

Proposition A.2. The system eligibility vector, E can be computed appropriate to a given state of the system by taking the logical dot product of the relevance matrix R and the system status vector, S.

Proof: From Definition A.5 it follows that:

$$[R \cdot S]_i = \bigwedge_{j=1}^{J} (r_{ij} \vee s_j).$$

From Definitions A.4 and A.1 it follows that $r_{ij} \vee s_j = 1$ if and only if the condition j is either met or irrelevant to enabling procedure i. Then by proposition A.1 is follows that $[R \cdot S]_i = 1$ if and only if all conditions of the unary predicates $R_i$ are satisfied. Thus, $[R \cdot S]_i = E_i$ by Definition A.2, and it is proved that $E = R \cdot S$ as proposed.

APPENDIX B

Specific definitions are assigned to the constructs T, F, V and their functional relationship. The definitions which follow are used to restrict access of application programs.

Definition B.1. The $j^{th}$ element, $t_{ij}$ of the true condition vector, $T_i$ is a binary status indication associated with the procedure i and the system status condition, j such that $t_{ij}=1$ implies condition j is either satisfied or unchanged by the completion of procedure i.

Definition B.2. The $j^{th}$ element, $f_{ij}$ of the false condition vector, $F_i$ is a binary status indication associated with the procedure i and the system status condition, j. The element $f_{ij}=1$ implies the condition j is either not satisfied or unchanged by the completion of procedure i.

Definition B.3. The variable condition update vector, V is a set of binary status indications which can be set dynamically by the procedure running in a sequential processor. The component $V_j$ is set to 1 by the procedure to indicate that system status condition j is satisfied or $V_j$ is set to 0 to indicate condition j is not satisfied.

Proposition B.1. The four possible implications on change in system following completion of procedure i can be computed according to the formula:

$$S = (S \wedge T_i) \vee (F_i \wedge V_j) \vee (T_i \wedge \overline{F_i})$$

where the bar indicates the logical NOT operation.

Proof: The proof follows directly from the definitions of the associated vectors as shown in the Truth Table B.1 given below.

It should be noted that there are many forms which proposition B.1 could take. The expression used has the advantage of restricting the range of $V_i$ such that procedure i can only modify conditions for which it is authorized.

Proposition B.2. The range of V is restricted such that V modifies only a specified subset of the system status conditions, j. This subset is determined by $T_i$ and $F_i$ for procedure i such that $S_j$ is determined by $V_j$ if and only if $t_{ij}=0$.

Proof: The implied new values of $S_j$ for the various values of $t_{ij}$ and $f_{ij}$ from proposition B.1 are shown in Table B.2 taken from Table B.1 from which the proposition follows directly.

TABLE B.1

SYSTEM STATUS CONDITION TRANSITION TRUTH TABLE

| $S_{jOLD}$ | $f_{ij}$ | $t_{ij}$ | $V_j$ | $S_{jNEW}$ | EXPLANATION |
|---|---|---|---|---|---|
| 0 | 0 | 0 | 0 | 0 | S set variably false |
| 0 | 0 | 0 | 1 | 1 | S set variably true |
| 0 | 0 | 1 | 0 | 1 | S set true fixed |
| 0 | 0 | 1 | 1 | 1 | S set true fixed |
| 0 | 1 | 0 | 0 | 0 | S set false fixed |
| 0 | 1 | 0 | 1 | 0 | S set false fixed |
| 0 | 1 | 1 | 0 | 0 | S unchanged |
| 0 | 1 | 1 | 1 | 0 | S unchanged |
| 1 | 0 | 0 | 0 | 0 | S set variably false |
| 1 | 0 | 0 | 1 | 1 | S set variably true |
| 1 | 0 | 1 | 0 | 1 | S set true fixed |
| 1 | 0 | 1 | 1 | 1 | S set true fixed |
| 1 | 1 | 0 | 0 | 0 | S set false fixed |
| 1 | 1 | 0 | 1 | 0 | S set false fixed |
| 1 | 1 | 1 | 0 | 1 | S unchanged |
| 1 | 1 | 1 | 1 | 1 | S unchanged |

TABLE B.2

RESTRICTIONS ON THE RANGE OF V

| $t_{ij}$ | $f_{ij}$ | $S_{NEW}$ | Implications to System Status |
|---|---|---|---|
| 1 | 1 | $S_{jOLD}$ | unchanged |
| 1 | 0 | 1 | set true |
| 0 | 1 | 0 | set false |
| 0 | 0 | $V_j$ | set variably |

APPENDIX C

In order to accommodate exclusive data access as well as prohibiting simultaneous activation of the same procedure in more than one processor, the single activation vector is extended so as to negate availability of data which is to be updated by a procedure. This will accommodate the equivalent of a single step function very useful in checkout phases in parallel programs. This can be done by defining a matrix whose row vectors are associated with procedures. Each $A_i$ is defined as a logical subset of the row in R associated with i. And so its definition follows from the definition of R (Appendix A) for any particular implementation.

Definition C.1. The vector $A_i$ is a set of binary status conditions $A_{ij}$, where the index j is associated with the conditions whose status is maintained in S. $A_{ij}=1$ if and only if the $j^{th}$ condition is a mutually exclusive data availability condition required at entry to procedure i; $A_{ij}=0$ otherwise. If $\bar{A}_i$ equals the $i^{th}$ row in R identically, then all such procedures with any entry conditions in common must execute sequentially.

Proposition C.1. Modifying the system status vector according to the formal $S=S \wedge \bar{A}_i$ prior to entry is sufficient to effect access protection for procedure i.

The proof of this proposition follows immediately from Definitions C.1, A.1, and A.4.

Proposition C.2. Modifying the system status vector according to the formula $S=S \vee A_i$ restores S to its original value.

Proof: The proof of this proposition follows directly from Definition C.1 and Proposition C.1 if there are no changes to S between entry and exit of the $i^{th}$ procedure. When there are other procedures initiated or terminated in the interval, the proof holds because no procedures can proceed in parallel if they are affected by or affect the same data availability condition covered by $A_i$. And therefore, for every condition for which $A_{ij} \neq 0$ there will have been no intermediate change to S and the proof is completed.

Proposition C.3. The change in system status following completion of procedure i can be computed according to the formula:

$$S=[(S \cup A_i) \wedge T_i] \vee (\bar{F}_i \wedge V_i) \vee (T_i \wedge \bar{F}_i)$$

The proof follows directly from the proofs of propositions B.1 and C.2.

What is claimed is:

1. A modular hardware executive apparatus for use in a multiprocessing system for concurrent operation of a plurality of data processors for solving computational problems defined by a plurality of application programs and a control program, said data processors connected for accessing said plurality of application programs stored in application program memory storage means and data stored in data memory storage means including at least a common data memory area accesible by said plurality of data processors, said plurality of data processors generating variable status indications upon execution of said application programs said hardware executive apparatus connected to said plurality of data processors and executing said control program and comprising:

(a) at least one status storage means for storing status indications $S_j$ corresponding to data conditions defined on elements of a data set appropriate for determining eligibility of said application programs, whereby said stored status indications correspond to data conditions which are relevant for enabling execution of application programs by said plurality of processors which are utilized in solving said computational problems;

(b) a plurality of modular units, each unit including a relevance storage means for storing groups of relevance indications $R_{ij}$ each group corresponding to the relevance of at least some of said status indications to at least one of said application programs where i is an integer designating one of said groups and corresponding one of said application programs and j is an integer designating one of said status indications;

(c) means connected to said status storage means and connected to receive said variable status indications from said data processors, and responsive to said variable status indications for updating said status indications stored in said status storage means at the completion of execution of said application program each of said variable status indications having a given value corresponding to and indicating satisfaction of a given one of said data conditions, said given data conditions being logical relationships involving at least one element of said data set being determined by said data processors upon execution of said application programs, said updating means including means for modifying a plurality of said status indications upon execution of at least one of said application programs;

(d) means connected to at least two of said relevance storage means and said at least one status storage means for determining the eligibility of at least some of said application programs for execution by said plurality of processors; and (e) means responsive to said eligibility determining means and operatively connected to said data processors for enabling execution of eligible application programs by said plurality of data processors whereby at least some of said application programs which are determined eligible may be executed concurrently.

2. A hardware executive apparatus as recited in claim 1, wherein said data processors solve a plurality of disjoint computational problems, said disjoint computational problems defined by different groups of application programs, and wherein said relevance storage means of each modular unit stores relevance indications associated with a different group of application programs.

3. A hardware executive apparatus as recited in claim 2, wherein said at least one status storage means comprises a plurality of separate status storage means, said updating means comprises a plurality of separate updating means, said eligibility determining means comprises a plurality of separate eligibility determining means and said execution enabling means comprises a plurality of separate execution enabling means, each modular unit further including one of said plurality of separate status storage means, one of said plurality of separate updating means, one of said plurality of separate eligibility determining means and one of said plurality of separate execution enabling means, wherein each modular unit forms a separate hardware executive apparatus for a different group of application programs.

4. A hardware executive apparatus as recited in claim 3, wherein each of said separate status storage means comprises a status register having bit storage positions corresponding to status indications on a different, disjoint data set corresponding to said different groups of application programs.

5. A hardware executive apparatus as recited in claim 4, wherein each bit storage position of each of said status storage registers corresponds to one status indication.

6. A hardware executive apparatus as recited in claim 4, further comprising a plurality of interface controllers, one interface controller connected between each modular unit and said plurality of data processors, each interface controller comprising groups of interface registers, each group of interface registers connected to one of said plurality of data processors and comprising:

(a) an application program designation address register for storing an application program designation address for an application program determined to be eligible, and (b) an index register for storing application program identifying data for said eligible application programs.

7. A hardware executive apparatus as recited in claim 4, wherein each of said relevance storage means comprises a relevance matrix storage means wherein each of said groups, i, form rows (columns) of said matrix storage means and individual relevance indications form columns (rows) of said matrix, each column (row) corresponding to one of said status indications on said data set.

8. A hardware executive apparatus as recited in claim 7, wherein for any given modular unit, said separate means for determining the eligibility of application program i comprises means for multiplying each status indication $S_j$ stored in said status storage register of said given modular unit and each corresponding relevance indication $R_{ij}$ stored in said relevance matrix storage means of said given modular unit to form a given logic state.

9. A hardware executive apparatus as recited in claim 8, wherein each of said application program eligibility determining means further comprises logic means for requiring the results of each multiplication to be a predetermined logic state, whereby in said given modular unit, application program i is eligible if all status indications $S_j$ in said given modular unit corresponding to relevance indications $R_{ij}$ are in said predetermined logic state.

10. A hardware executive apparatus as recited in claim 9, wherein, in said given modular unit, said means for updating said status indications comprises:

(a) means responsive to said data processors for sensing the completion of execution of each application program i of said given modular unit;

(b) means for storing fixed status indications (T,F) associated with each application program i, of said given modular unit, said fixed status indications determined by a given one of said computational problems independently of values of said associated data set;

(c) means for storing said variable status indications received from said data procesors; and (d) said means for modifying including logic circuit means responsive to said stored status indications, said stored fixed status indications and said variable status indications for generating update status indications said logic circuit means connected to said status storage means for storage of said update status indications in said status storage means of said given modular unit.

11. A hardware executive apparatus as recited in claim 10, wherein said fixed status indications (T,F) are stored in a matrix storage means, each row (column) thereof corresponding to one of said application programs of said given modular unit, and each column (row) thereof corresponding to one of said status indications $S_j$ of said given modular unit, and said means for storing said variable status indications comprises a storage register V having bit positions corresponding to said status indications of said status storage means.

12. A hardware executive apparatus as recited in claim 11, wherein said means for enabling execution of said eligible application programs comprises a plurality of application program designation address storage means for defining designation addresses for execution of eligible application programs, and a plurality of data access pointers corresponding to each of said application programs.

13. A hardware executive apparatus as recited in claim 12, wherein said application program designation address storage means comprises storage registers.

14. A hardware executive apparatus as recited in claim 13, wherein said apparatus further comprises an index register for storing application program identification data, said updating means of said given modular unit responsive to said application program identification data of said index register for identifying said application program i of said given modular unit.

15. A hardware executive apparatus as recited in claim 12, further comprising a plurality of interface controllers, one interface controller connected between each modular unit and said plurality of data processors, each interface controller comprising groups of interface registers, each group of interface registers connected to one of said plurality of data processors and comprising:

(a) an application program designation address register for storing an application program designation address from said associated application program designation address storage means for an application program determined to be eligible, and (b) an index register for storing application program identifying data for said eligible application programs.

16. A hardware executive apparatus as recited in claim 15, wherein each group of interface registers further comprises a data register for storing said data access pointers for eligible application programs.

17. A hardware executive apparatus as recited in claim 16, wherein each group of interface registers further comprises:

fixed status registers for loading said fixed status indications into said fixed status indication storing means of said associated modular unit, and a variable status register for loading said variable status indications into said variable status indication storing means of said associated modular unit.

18. A computing system for solving a plurality of disjoint computational problems, each said disjoint computation problem solved by execution of a plurality of application programs and a control program, said system comprising:

(a) a plurality of data processors connected for accessing application program memory storage means storing said application programs and data memory storage means storing data elements, said data memory storage means having at least a data memory area commonly accessible by said plurality of data processors and at least one of said plurality of data processors including means for generating at least one variable status indication determined upon execution of at least one of said plurality of application programs;

(b) a plurality of system controller modular units, each unit operable for execution of one of said control programs for controlling execution of application programs corresponding to a different one of said disjoint computational problems, each unit including:

(1) a status register for storing status indications $S_j$ of a plurality of data conditions appropriate for said one of said disjoint computational problems;

(2) a relevance matrix store for storing indications $R_{ij}$ of the relevance of each data condition j to each application program i of said corresponding plurality of application programs;

(3) means connected to said status register and responsive to said at least one variable status indication for updating said status indications of said status register said at least one variable status indication indicating satisfaction of a data condition, said data condition being a logical relationship involving at least one of said data elements, said at least one data element having a value determined by said at least one data processor upon execution of said at least one application program, said updating means including means for modifying a plurality of said status indications in response to execution of one of said applications;

(4) means for storing a plurality of application program designation addresses corresponding to each application program;

(5) means responsive to said status indications of said status register, said corresponding relevance indications of said relevance matrix store and said application program designation addresses of said application program designation storing means for determining the eligibility of each application program for execution by said plurality of data processors and for generating designation addresses from said application program designation address storage means for application programs determined to be eligible, wherein eligible programs are executed concurrently in said plurality of data processors; and (6) synchronization and control logic means for synchronizing and controlling operation of said system controller modular unit;

whereby said system controller modular units form a hardware executive apparatus for said computing system; and (c) interface means connected between said plurality of data processors and said plurality of system controller modular units.

19. A general purpose computing machine as recited in claim 1 or 18 wherein said application programs are event-driven data transformation programs without direct transfer of control therein or to other application programs.

20. A general purpose computing machine as recited in claim 18 wherein said system controller modular units are operable for determining eligibility based on a plurality of unary predicates associated with the applicability of the transitions between states of said machine for solving said algorithm.

21. A computing system as recited in claim 18, wherein said interface means comprises a plurality of interface controllers, one interface controller connected between each modular unit and said plurality of data processors, each interface controller comprising groups of interface registers, each group of interface registers connected to one of said plurality of data processors and comprising:

(a) an application program designation address register for storing an application program designation address from said associated application program designation address storage means for an application program determined to be eligible, and (b) an index register for storing application program identifying data for said eligible application programs.

22. A computing system as recited in claim 21, wherein:

each group of interface registers comprises a type register for storing indications of the processor type requesting access to said system controller modular unit;

each of said system controller modular units further comprises a plurality of processor type storage means corresponding to each application program i, said processor type storage means storing indications of the type of data processor appropriate for executing said corresponding application program i; and said means for determining eligibility of each application program i comprising means for comparing indications of the data processor type stored in said interface type register with said indications of said data processor type stored in said processor type storage means;

whereby said plurality of application programs may be executed by specific types of said plurality of data processors.

23. A computing system as recited in claim 22, wherein said means for determining the eligibility of each application program i further comprises:

(a) means for forming a logical operation with each status indications $S_j$ and each corresponding relevance indication $R_{ij}$ to form a logic state; and (b) logic means for requiring each of said logic operations to be in a predetermined logic state such that application program i is eligible if all status indications $S_j$ corresponding to said relevant indications $R_{ij}$ are in said predetermined logic state, and said processor requesting access to said system controller is of the type appropriate for executing said application program.

24. A computing system as recited in claim 23, wherein said relevance matrix store comprises sequentially stored groups i of binary relevance indications $R_{ij}$ and said synchronization and control logic means sequentially select groups of indications of said relevance matrix store for feeding same to said eligibility determining means.

25. A computing system as recited in claim 24, further comprising means for preventing execution of the same application program in more than one of said plurality of data processors at the same time.

26. A computing system as recited in claim 25, wherein said execution preventing means comprises means for providing a predetermined status indication $S_j$ in said status register corresponding to those status indications utilized in determining eligibility of an application program currently being executed, whereby other application programs utilizing said predetermined status indications are not determined eligible by said eligibility determining means.

27. A modular computing system comprising:

(a) a plurality of data processors connected for accessing application program memory storage means storing application programs and data memory storage means storing data, said data memory storage means having at least a data memory area commonly accessible by said plurality of data processors said plurality of data processors including means for computing data in accordance with said application programs and means for generating at least one variable status indication corresponding to other than a program termination event and representing satisfaction of at least one data condition dependent upon at least one non-predetermined value of data processed by said data processing means;

(b) a plurality of Z modular units, each modular unit including:
  (1) a status register for storing M binary status indications of M data conditions appropriate for partially determining the eligibility of said application programs stored in said application program memory storage means, Z and M being integers, at least one status register of at least one modular unit storing said variable status indication received from at least one of said data processors;
  (2) a relevance matrix store for storing binary indications of the relevance of each of said M data conditions to each of said application programs; and
  (3) means connected to said status register for updating said M binary status indications of said status register at least one updating means of at least one modular unit connected to receive said variable status indication;

(c) means for storing a plurality of application program designation addresses corresponding to said application programs;

(d) means connected to said relevance matrix stores and said status registers for determining the eligibility of said application programs for execution by said plurality of data processors, said eligibility determining means responsive to said ZM binary status indications of said Z status registers and said corresponding ZM binary relevance indications of said Z relevance matrix stores;

(e) logic circuit means for synchronizing and controlling said modular units, for scheduling execution of said application programs, said logic circuit means operative in cooperation with said application program designation address storing means for generating designation address for application programs determined to be eligible; and (f) interface means for interconnecting said Z modular units and said logic circuit means with said plurality of data processors, said interface means receiving said designation addresses and storing same for access by said plurality of data processors whereby a plurality of eligible programs may be executed concurrently, and whereby Z modular units may be utilized in said computing system for increasing the number of data conditions for a computational problem to be solved by said computing system.

28. A modular computing system as recited in claim 27 further comprising:
  a processor type storage means for storing indications of the type of data processor appropriate for executing each application program; and wherein
  said interface means comprises a type register for storing indications of the processor type requesting access to said application programs;
  said means for determining eligibility of said application programs further comprises means for comparing indications of the data processor type stored in said interface type register with said indications of said data processor type stored in said processor type storage means;

whereby said plurality of application programs may be executed by specific types of said plurality of data processors.

29. A modular computing system as recited in claim 27 wherein each relevance matrix store comprises sequentially stored groups of binary relevance indications $R_{ij}$, each group corresponding to an $i^{th}$ one of said application programs, and said control and control logic circuit means sequentially selects groups of indications of said relevance matrix store for feeding same to said eligibility determining means.

30. A modular computing system as recited in claim 29 wherein said logic circuit means is operable for restarting said sequential selection of said stored groups of binary relevance indications after an application program is determined eligible by said eligibility determining means,
  whereby the order of said storage of said binary indications in said relevance matrix store provides a priority selection mechanism for said application programs.

31. A modular computing system as recited in claim 27 further comprising means for preventing execution of the same application program in more than one of said plurality of data processors at the same time.

32. A modular computing system as recited in claim 31 wherein said execution preventing means comprises means for providing a false status indications $S_j$ corresponding to those status indications required true for eligibility of an application program currently being executed, whereby said application programs currently being executed may not be determined eligible by said eligibility determining means.

33. A modular computing system as recited in claim 27, wherein said eligibility determining means comprises:
  (a) a procedure eligibility determination circuit for each modular unit, each of said circuits providing a component eligibility output signal in response to the associated M binary status indications and M binary relevance indications of each of said application programs; and
  (b) means responsive to said component eligibility output signals from each modular unit for providing an eligibility determination signal whereby said eligibility determination signal is responsive to said ZM binary status indications and said ZM binary relevance indications for each of said application programs, and wherein said synchronization and control logic circuit means is operative in response to said eligibility determination signal for enabling generation of said designation addresses.

34. A modular computing system as recited in claim 33 further comprising means for storing an application program type indication associated with each of said application programs stored in said application program memory storage means and wherein said eligibility determining means further comprises a comparison circuit for comparing the type of processor seeking access to said application programs with the stored application program type designation and for providing an additional component eligibility output signal, said eligibility determination signal means responsive to said additional component eligibility output signal for providing said eligibility determination signal.

35. A modular computing system as recited in claim 33 wherein said procedure eligibility determination circuit for each modular unit comprises means for forming a logical operation with each of said associated M binary status indications and each corresponding M binary relevance indications for each of said application programs such that said component eligibility output signal is provided only if the results of all of said logical operations are a predetermined logic state, and said means for providing said eligibility determination signal comprises means for logically combining said component eligibility output signals such that said eligibility determination signal is provided only if all of said component eligibility output signals are in said predetermined logic state.

36. A modular computing system as recited in claim 27 or 35, wherein said interface means comprises:
(a) an execute register for storing said application program designation addresses; and
(b) an index register for storing identifying representations of application programs at the completion of execution by said data processors.

37. A modular computing system as recited in claim 36, wherein said interface means further comprises a busy/not busy binary indicator register for indicating whether the modular units are busy/not busy upon request for access by said data processors.

38. A modular computing system as recited in claim 36, wherein said interface means comprises a multiport controller and a plurality of execute, and index registers corresponding to said plurality of data processors.

39. A modular computing system as recited in claim 36, wherein said interface means comprises a binary mode indication register (X) loaded by said data processors for identifying entry and exit modes of operation:
said system operable in said entry mode of operation in response to loading of said mode indication register by the $k^{th}$ one of said plurality of data processors for determining eligibility of the $i^{th}$ one of said application programs for execution by said $k^{th}$ data processor and for generating an application program designation address corresponding to said $i^{th}$ application program for storage in said execute register of said interface means for loading by said $k^{th}$ data processor whereby said $k^{th}$ data processor executes said $i^{th}$ application program; and
said system operable in said exit mode in response to loading of said mode indication register by said $k^{th}$ data processor for receiving application program identifying data of said $i^{th}$ application program loaded by said $k^{th}$ data processor into said index register of said interface means for enabling said updating means to update said status register, wherein k is an integer designating one of said data processors and i is an integer designating one of said application programs.

40. A modular computing system as recited in claim 39, wherein each modular unit further comprises:
means for storing fixed status modifying indications (T,F) for modifying said status register upon completion of execution of said $i^{th}$ application program, said fixed status modifying indications determined by said computational problem to be solved independent of data values computed in said $k^{th}$ data processor; and
said interface means further comprises means for storing said variable status indications (V) associated with completion of said $i^{th}$ application program, each of said updating means receiving said fixed status indications and said variable status indications for determining updated binary status indications of said data conditions and for storing same in each of said status registers.

41. A modular computing system as recited in claim 40, wherein said interface means further comprises means for storing said fixed status indications for loading into said fixed status indications storing means of each modular unit.

42. A modular computing system comprising:
(a) a plurality of data processors accessing application program memory storage means storing application programs and data memory storage means storing data, said data memory storage means having at least a data memory area commonly accessible by said plurality of data processors said plurality of data processors including means for computing data in accordance with said application programs and means for generating at least one variable status indication corresponding to other than a program termination event and representing satisfaction of at least one data condition dependent upon at least one non-predetermined value of data processed by said data processing means;
(b) a system controller comprising:
(1) a status register for storing M binary status indications of a plurality of M data conditions appropriate for determining the eligibility of up to ZN application programs stored in said application program memory storage means, Z, M and N being integers and N being less than the number of application programs stored in said application program memory storage means and utilized for solving a computational problem by said computing system,
(2) a plurality of Z modular units, each modular unit including:
(i) a relevance matrix store for storing binary indications of the relevance of each of said M data conditions to each of as many as N application programs, said relevance indications being different from one modular unit to another and corresponding to different groups of application programs, each group having as many as N application programs;
(ii) means connected to said status register for updating said binary status indications of said status register at least one updating means of at least one modular unit connected to receive said variable status indication for updating said binary status indications in response thereto; and
(iii) means for storing up to ZN application program designation addresses corresponding to said application programs; and
(3) means connected to said relevance matrix stores and said status register for determining the eligibility of said up to ZN application programs for execution by said plurality of data processors, said eligibility determining means responsive to said M binary status indications of said status register and said M corresponding binary relevance indications of said relevance matrix store;
(4) logic circuit means for synchronizing and controlling said modular units, said logic circuit means operative in cooperation with said application program designation address storing means for generating designation addresses for application programs determined to be eligible; and (c) interface means for interconnecting said Z modular units and said logic circuit means with said plurality of data processors, said interface means receiving said designation addresses and storing same for access by said plurality of data processors whereby a plurality of eligible programs may be executed concurrently, and whereby any number of Z modular units may be utilized in said computing system for increasing the number of application programs utilized for solving a computational problem by said computing system.

43. A modular computing system as recited in claim 42, wherein said means for determining eligibility of said up to ZN application programs comprises a procedure eligibility determination logic circuit for each modular unit, each procedure eligibility determination logic circuit providing a component eligibility output signal and said system controller further comprising:

a priority selection circuit responsive to said component eligibility output signals for enabling said synchronization and control logic circuit means to generate an application program designation address and for generating module selection signals corresponding to a selected modular unit, and multiplexing means connected between said interface means and said plurality of modular units and responsive to said module selection signals for feeding application program designation addresses from said selected modular unit to said interface means.

44. A modular computing system as recited in claim 43, wherein said interface means comprises:
   (a) an execute register for storing application program designation addresses, and
   (b) an index register for storing indentifying representations of modular units and application programs controlled by said modular units.

45. A modular computing system as recited in claim 44, wherein said interface means comprises a binary mode indication register (X) loaded by said data processors for identifying entry and exit modes of operation:

said system operable in said entry mode of operation in response to loading of said mode indication register by the $k^{th}$ one of said plurality of data processors for determining eligibility of the $i^{th}$ one of said application programs for execution by said $k^{th}$ data processor and for generating an application program designation address corresponding to said $i^{th}$ application program for storage in said execute register of said interface means for loading by said $k^{th}$ data processor whereby said $k^{th}$ data processor executes said $i^{th}$ application program; and said system operable in said exit mode in response to loading of said mode indication register by said $k^{th}$ data processor for receiving application program identifying data of said $i^{th}$ application program loaded by said $k^{th}$ data processor into said index register of said interface means for enabling said updating means to update said status register, wherein k is an integer designating one of said data processors and i is an integer designating one of said application programs.

46. A modular computing system as recited in claim 45, wherein each modular unit further comprises:

means for storing fixed status indications (T,F) for said status register upon completion of execution of said $i^{th}$ application program, said fixed status indications determined by said computational problem to be solved independent of data values computed in said $k^{th}$ data processor; and each of said updating means receiving said fixed status indications and said at least one variable status indications of said data conditions and storing same said status register.

47. A modular computing system as recited in claim 46, wherein said interface means further comprises means for storing said fixed status modifying indications for loading into said fixed status modifying indications storing means of each modular unit.

* * * * *